(12) United States Patent  (10) Patent No.: US 7,401,923 B2
Fergason  (45) Date of Patent: Jul. 22, 2008

(54) MONITOR FOR SHOWING HIGH-RESOLUTION AND THREE-DIMENSIONAL IMAGES AND METHOD

(75) Inventor: James L. Fergason, Menlo Park, CA (US)

(73) Assignee: Fergason Patent Properties, LLC, Menlo Park, CA (US)

( * ) Notice: Subject to any disclaimer, the term of this patent is extended or adjusted under 35 U.S.C. 154(b) by 351 days.

(21) Appl. No.: 11/075,906

(22) Filed: Mar. 9, 2005

(65) Prior Publication Data

US 2007/0159602 A1 Jul. 12, 2007

Related U.S. Application Data

(60) Provisional application No. 60/631,079, filed on Nov. 23, 2004, provisional application No. 60/551,700, filed on Mar. 9, 2004.

(51) Int. Cl.
*G03B 21/14* (2006.01)
*G02B 27/22* (2006.01)

(52) U.S. Cl. .............................. 353/8; 353/20; 359/464

(58) Field of Classification Search .................... 353/7, 353/8, 10, 20; 349/15; 359/464, 465, 629, 359/630, 472, 477
See application file for complete search history.

(56) References Cited

U.S. PATENT DOCUMENTS

| | | | |
|---|---|---|---|
| 2,845,618 A | 7/1958 | Huffman |
| 3,777,059 A | 12/1973 | Wilkey, Jr. |
| 4,385,806 A | 5/1983 | Fergason |
| 5,074,645 A | 12/1991 | Gold et al. |
| 5,300,942 A | 4/1994 | Dolgoff |
| 5,416,496 A | 5/1995 | Wood |
| 5,421,589 A | 6/1995 | Monroe |
| 5,453,859 A | 9/1995 | Sannohe et al. |
| 5,598,282 A | 1/1997 | Degroof |
| 5,644,427 A | 7/1997 | Omori et al. |
| D385,533 S | 10/1997 | Adams |
| 5,717,422 A | 2/1998 | Fergason |
| 5,777,665 A | 7/1998 | McNelley et al. |
| 5,847,710 A | 12/1998 | Kroitor |
| D415,124 S | 10/1999 | Rooyakkers et al. |

(Continued)

FOREIGN PATENT DOCUMENTS

DE 195 34 750 3/1997

(Continued)

OTHER PUBLICATIONS

International Search Report and Written Opinion for International Application No. PCT/US2006/028263 dated Nov. 29, 2006.

(Continued)

*Primary Examiner*—William C. Dowling
(74) *Attorney, Agent, or Firm*—Renner, Otto, Boisselle & Sklar, LLP

(57) ABSTRACT

A display system in which images from two displays that have the same optical polarization that is not affected by reflection by a beam splitter which combines images from the displays, and half wave plate optical retarders to rotate plane of polarization and to null out optical dispersion effects to provide for stereo viewing of images via plane polarizers that have the same polarization direction.

30 Claims, 15 Drawing Sheets

U.S. PATENT DOCUMENTS

| | | | |
|---|---|---|---|
| 5,976,017 A * | 11/1999 | Omori et al. ................... 463/32 |
| D428,864 S | 8/2000 | Rooyakkers et al. |
| 6,124,920 A * | 9/2000 | Moseley et al. ............. 349/201 |
| 6,130,784 A | 10/2000 | Takahashi |
| 6,160,666 A | 12/2000 | Rallison et al. |
| D438,206 S | 2/2001 | Joshi |
| D440,543 S | 4/2001 | Kodimer |
| 6,212,068 B1 | 4/2001 | Rooyakkers et al. |
| 6,215,532 B1 * | 4/2001 | Takagi et al. ................... 349/11 |
| 6,271,924 B1 | 8/2001 | Ngoi et al. |
| D455,427 S | 4/2002 | Vejbrink |
| 6,400,394 B1 | 6/2002 | Kim et al. |
| 6,449,090 B1 * | 9/2002 | Omar et al. ................. 359/465 |
| 6,522,310 B1 | 2/2003 | Kim |
| 6,593,957 B1 * | 7/2003 | Christie ........................ 348/42 |
| 6,611,241 B1 | 8/2003 | Firester et al. |
| 6,633,306 B1 | 10/2003 | März et al. |
| 6,703,988 B1 | 3/2004 | Fergason |
| D492,676 S | 7/2004 | Monson et al. |
| 6,765,640 B1 | 7/2004 | Acosta et al. |
| 6,831,711 B2 | 12/2004 | Choi et al. |
| 2001/0052956 A1 | 12/2001 | Lee et al. |
| 2002/0085284 A1 | 7/2002 | Nakamura et al. |
| 2004/0114080 A1 | 6/2004 | Miyachi |
| 2004/0223218 A1 | 11/2004 | Putilin et al. |
| 2005/0078253 A1 | 4/2005 | Kim et al. |
| 2005/0128400 A1 | 6/2005 | Wang et al. |
| 2005/0185139 A1 * | 8/2005 | Yamanaka et al. ............. 353/20 |
| 2006/0232719 A1 * | 10/2006 | Abileah ....................... 349/15 |
| 2006/0268407 A1 * | 11/2006 | Fergason et al. ............. 359/487 |
| 2006/0290889 A1 * | 12/2006 | Robinson et al. ................ 353/8 |

FOREIGN PATENT DOCUMENTS

| | | |
|---|---|---|
| EP | 0 505 998 A2 | 9/1992 |
| EP | 0 505 998 A3 | 9/1992 |
| EP | 1 037 093 | 9/2000 |
| ES | 2 024 269 | 2/1992 |
| JP | 63-74027 | 4/1988 |
| JP | 5-168046 | 7/1993 |
| JP | 05-168046 | 7/1993 |
| JP | 06 160834 | 6/1994 |

OTHER PUBLICATIONS

Pat Abst JP v017 n575 E1449, JP, Abstract.

Partial International Search Report for International Application No. PCT/US05/042499 dated Apr. 11, 2006.

International Search Report and Written Opinion for International Application No. PCT/US2005/042306 dated Jun. 27, 2006.

* cited by examiner

MONITOR FOR SHOWING HIGH-RESOLUTION AND THREE-DIMENSIONAL IMAGES AND METHOD

This application claims the benefit of U.S. Provisional Application No. 60/551,700, filed Mar. 9, 2004, and No. 60/631,079, filed Nov. 23, 2004, which are incorporated herein by reference in their entireties.

Cross reference is made to pending U.S. patent application Ser. No. 10/721,968, filed Nov. 24, 2003, the entire disclosure of which hereby is incorporated by reference. Cross reference also is made to U.S. Pat. No. 4,385,806, U.S. Pat. No. 5,717, 422, and U.S. Pat. No. 6,703,988, the entire disclosures of which hereby are incorporated by reference.

TECHNICAL FIELD

The invention relates generally to apparatus and method for displaying three-dimensional images (sometimes referred to as stereoscopic images).

BACKGROUND

Some current three-dimensional displays are based either on imaging techniques which give rise to an apparent stereo effect (also referred to as stereoscopic effect and/or three dimensional or 3D effect) by perspective views or on two images being presented that are separated such that the right eye and left eye see their respective images, which are distinguished or differentiated, for example, by polarization characteristics of light. Two images separated or distinguished by polarization can either be superimposed as they are with two movie projectors or they may be displayed time sequentially to give an image which appears to be continuous. Autostereo is another technique for presenting and viewing stereo images.

An exemplary 3D display system is disclosed in the above-mentioned U.S. Pat. No. 6,703,988 and U.S. patent application Ser. No. 10/721,968, each of which are hereby incorporated by reference in their entireties.

SUMMARY

An aspect relates to a system for images, including a beam splitter receiving respective images, which have plane polarized light characteristics, along respective first and second light paths and directing the images to a common light path, a viewer to receive the images in the common light path to discriminate the images based on plane polarized light characteristics, the viewer having first and second viewing channels to provide for viewing the images from the first and second light paths, respectively, a first optical retarder introducing optical retardation in the first light path, the optical retarder rotating the direction of polarization of plane polarized light, and a second optical retarder introducing optical retardation in the second viewing channel and substantially compensating for dispersion by the first optical retarder.

Another aspect relates to a method for presenting and viewing images, including directing to a beam splitter respective images, which have plane polarized light characteristics, along respective first and second light paths and directing the images via the beam splitter to a common light path, viewing the images via a viewer that receive the images in the common light path and discriminates the images based on plane polarized light characteristics, the viewer having first and second viewing channels to provide for viewing the images from the first and second light paths, respectively, introducing optical retardation in the first light path, the optical retarder rotating the direction of polarization of plane polarized light, and introducing optical retardation in the second viewing channel, including compensating for dispersion by the first optical retarder.

Another aspect relates to a display system, including a pair of displays arranged at an angle to each other to provide respective images having plane polarization such that the polarization direction for both images is the same, a beam splitter located relative to the displays to combine plane polarized light images received along respective first and second optical paths from the displays to provide such plane polarized light images along a common optical path, a wave plate arrangement in said first optical path to effect optical retardation of plane polarized light to rotate the plane of polarization thereof, the displays, beam splitter and wave plate being related such that reflection of light by the beam splitter from one of the respective optical paths occurs substantially without changing the polarization, whereby the respective images in the common optical path can be discriminated by optical polarization.

Another aspect relates to a stereoscopic viewing system, including a pair of displays arranged generally in respective planes that are at an angle to each other and intersect a common linear axis, the displays having plane polarization such that the direction of polarization is in the same direction, a beam splitter at the bisectrix of the angle and in positional relation to combine light from said displays in a common light path by transmitting light from one display and reflecting light from the other display without changing polarization direction of the light incident on the beam splitter, an optical retarder in the light path between one of the displays and the beam splitter to rotate the plane of polarized light by 90 degrees, a viewing device for viewing images transmitted along the common light path, the viewing device including a pair of plane polarizers and a further optical retarder to rotate the plane of polarized light by 90 degrees, the plane polarizers establishing first and second viewing paths, the polarizer in the first viewing path having a polarization direction to transmit light from the one of said displays providing images in the optical path that includes the first mentioned optical retarder, the polarizer in the second viewing path having the same polarization direction as the polarizer in the first viewing path, and the further optical retarder positioned in the second viewing path.

Another aspect relates to a method of displaying stereo images, including providing along respective optical paths light, which has plane polarization in the same polarization direction, toward a beam splitter, optically retarding light in one of the optical paths to rotate the plane of polarization in that optical path by 90 degrees, using a beam splitter, reflecting and transmitting light from the respective optical paths into a common optical path substantially without affecting polarization, and discriminating light in the common optical path to distinguish between light from the respective optical paths, said discriminating including using respective plane polarizers, which have the same polarization direction, and providing optical retardation in the optical path to one of the plane polarizers whereby such plane polarizer blocks light that was optically retarded in said one of the optical paths while such plane polarizer transmits light from the other of said respective optical paths and the other plane polarizer transmits light from said one of the optical paths while blocking light from the other of said respective optical paths.

Another aspect relates to a display system, including a pair of displays, said displays being operable to provide respective left and right images of a stereo pair for viewing by a viewing device, the images provided by said displays having linear (plane) optical polarization in the same direction (itself or by using a plane polarizer in the optical path), a beam splitter, the displays and beam splitter positioned relative to each other for viewing of one display through the beam splitter and viewing of the other display by reflection, a first half wave plate between one display and the beam splitter and oriented to rotate in one direction the plane of polarization of light from one display for viewing as one of a left eye or right eye image, and a second half wave plate positioned and oriented to rotate in a direction opposite such one direction some light from the displays for permitting viewing of light from the other display as the other of a left eye or right eye image while blocking from such viewing light from said one display.

Another aspect relates to a display system, including a pair of displays, said displays being operable to provide respective left and right images of a stereo pair, the images provided by said displays having linear (plane) optical polarization in the same direction (itself or by using a plane polarizer in the optical path), a beam splitter, the displays being at an angle relative to each other and congruent with a linear axis, and the beam splitter being congruent with such linear axis and at the bisectrix of such angle for viewing of one display through the beam splitter and viewing of the other display by reflection, a first wave plate positioned relative to one display to rotate the plane of polarization of light from that display without rotating the plane of polarization of light from the other display, and a viewing device including a pair of plane polarizers positioned to transmit to respective eyes of a viewer respective left and right images from the respective displays, the plane of polarization of said pair of polarizers being the same and for use being relatively perpendicular to the plane of polarization of light from said displays, and a second wave plate positioned relative to the viewing device to rotate the plane of polarization of light transmitted to one of said polarizers without rotating the plane of polarization of light provided to the other polarizer.

Another aspect of the invention relates to a display system, including a pair of displays, each display being operable to provide an image having linear optical polarization (itself or by using a plane polarizer in the optical path), a beam splitter, the displays and beam splitter positioned relative to each other for viewing of one display through the beam splitter and viewing of the other display by reflection, and a half wave plate for rotating the plane of polarization of light from one display.

Another aspect of the invention relates to a system for images including a beam splitter receiving respective images, which have plane polarized light characteristics, along respective first and second light paths and directing the images to a common light path. The directing includes transmitting light from one light path and reflecting light from the other light path without changing the direction of optical polarization. A viewer receives the images in the common light path and discriminates the images based on plane polarized light characteristics. The viewer includes first and second viewing channels to provide for viewing the images from the first and second light paths, respectively.

Another aspect of the invention relates to a system for images, including a beam splitter receiving respective images, which have plane polarized light characteristics, along respective first and second light paths and directing the images to a common light path, wherein said directing comprises transmitting light from one light path and reflecting light from the other light path without changing the direction of optical polarization, a viewer to receive the images in the common light path to discriminate the images based on plane polarized light characteristics, the viewer having first and second viewing channels to provide for viewing the images from the first and second light paths, respectively, wherein the viewer includes a pair of plane polarizers having the same polarization direction, wherein the polarization direction of the plane polarized light in the first light path optically upstream of said first optical retarder is the same as the polarization direction of the plane polarized light in the second light path, wherein said first optical retarder the dispersion by the first optical retarder is canceled by the second optical retarder, a first optical retarder introducing optical retardation in the first light path, the optical retarder rotating the direction of polarization of plane polarized light, and a second optical retarder introducing optical retardation in the second viewing channel and to compensate for dispersion by the first optical retarder.

Another aspect relates to a display system, including a pair of displays arranged at an angle to each other to provide respective images having plane polarization such that the polarization direction for both images is the same, a beam splitter located relative to the displays to combine plane polarized light images received along respective first and second optical paths from the displays to provide such plane polarized light images along a common optical path, a wave plate arrangement in said first optical path to effect optical retardation of plane polarized light to rotate the plane of polarization thereof, whereby light in said respective optical paths incident on said beam splitter has different optical polarization, the displays, beam splitter and wave plate being related such that reflection of light by the beam splitter from one of the respective first and second optical paths occurs without changing the polarization, whereby the respective images in the common optical path can be discriminated by optical polarization using another wave plate arrangement and plane polarizers.

Another aspect of the invention relates to a display system including a pair of displays, each operable to provide respective images, a beam splitter, the beam splitter having optical polarization characteristics to provide different light transmission and light reflection effect based on optical polarization of light incident on the beam splitter, the displays and beam splitter being positionally related such that the beam splitter transmits light from one display and reflects light from the other display whereby the transmitted and reflected light are provided via the beam splitter in substantially the same direction, and wherein light that is incident on the beam splitter representing images that are provided by the displays is optically polarized in coordination with the optical polarization characteristics of the beam splitter.

Another aspect of the invention relates to a method of display including providing respective images using light having optical polarization characteristics to a beam splitter that has optical polarization characteristics to provide different light transmission and light reflection effect based on optical polarization of light incident on the beam splitter, wherein the beam splitter transmits light representing one image and reflects light representing the other image.

An aspect of the invention relates to a display system, including a pair of displays, each display being operable to provide an image having linear optical polarization (itself or by using a plane polarizer in the optical path), a polarizing beam splitter that preferentially transmits and reflects light based on optical polarization characteristics of the incident light, and the displays and beam splitter positioned relative to each other for viewing of one display through the beam splitter and viewing of the other display by reflection.

An aspect of the invention relates to a display system, including a pair of displays, each display being operable to provide an image having linear optical polarization (itself or by using a plane polarizer in the optical path), a polarizing beam splitter that preferentially transmits and reflects light based on optical polarization characteristics of the incident light, the displays and beam splitter positioned relative to each other for viewing of one display through the beam splitter and viewing of the other display by reflection, and the light from the respective displays being plane polarized such that the directions of polarization of light from the respective displays are relatively crossed, and one direction is parallel to the plane of the beam splitter.

An aspect of the invention relates to a display system, including a pair of displays, each display being operable to provide an image having linear optical polarization (itself or by using a plane polarizer in the optical path), a polarizing beam splitter that preferentially transmits and reflects light based on optical polarization characteristics of the incident light, and the displays and beam splitter positioned relative to each other for viewing of one display through the beam splitter and viewing of the other display by reflection, the displays being at an angle relative to each other and congruent with a linear axis, and the beam splitter being congruent with such linear axis and at the bisectrix of such angle for viewing of one display through the beam splitter and viewing of the other display by reflection.

Another aspect of the invention relates to a display system including a pair of displays, the displays being at an obtuse angle to each other; and a beam splitter so positioned relative to the two displays at the bisectrix of said angle to combine images from the displays whereby one image is transmitted by the beam splitter and the other image is reflected by the beam splitter to provide direct view of images from the displays.

Another aspect relates to a method of displaying stereo images, including simultaneously displaying a left image on a display and a right image on another display such that the left and right images have the optical polarization in the same direction, and using a beam splitter so positioned relative to the two displays that one can be viewed directly through the beam splitter and the other can be viewed by reflected light from the beam splitter combining those images in a common light path such that the optical polarization of the left image portion and the right image portion are different in such common light path such that the image portions can be separated based on optical polarization.

Another aspect relates to a method of presenting a stereoscopic image for viewing, including presenting a left eye image on a display, presenting a right eye image on another display that is at an angle relative to the first mentioned display, both said presenting steps presenting such images having optical polarization in the same direction, and using a beam splitter that is so positioned relative to the two displays combining in a substantially common light path the respective images such that the respective images in the common light path have different optical polarization, whereby the images can be separated based on polarization so that one image can be viewed directly through the beam splitter by one eye and the other can be viewed by reflected light from the beam splitter by the other eye.

Another aspect relates to a device for rotating the polarization direction of polarized light, including a source of linear polarized light that has a polarization direction at 45 degrees to a linear axis and is transmitted along an optical path, and a reflector in a plane that is parallel to and intersects the linear axis and oriented to reflect such linear polarized light, whereby the polarization direction of the reflected linear polarized light relative to the polarization direction of the linear polarized light prior to reflection is rotated 90 degrees about the optical path.

Another aspect relates to a method of rotating the polarization direction of linear polarized light that has a polarization direction at 45 degrees to a linear axis and is transmitted (propagates) along an optical path, including reflecting such linear polarized light using a reflector that is in a plane that is parallel to and intersects the linear axis, whereby the polarization direction of the reflected linear polarized light relative to the polarization direction of the linear polarized light prior to reflection is rotated 90 degrees about the optical path.

Another aspect relates to a display system, including, a first display having optical polarization characteristics, a second display smaller in area than the first display and having optical polarization characteristics, the second display being at an angle to the first display, a beam splitter at the bisectrix of the angle between the first and second displays combining in superimposed viewable relation along a common light path images from the second display with images from a corresponding area of the first display by transmitting an image from one display and reflecting an image from the other display while rotating the plane of linear polarization or sense of circular polarized light.

Another aspect relates to a stereo display device, including a flat display having a polarized light output, and a beam splitter positioned relative to the display for transmitting light from one part of the display to a viewing area and reflecting light from another portion of the display to the viewing area while rotating the direction of plane polarized light or changing the sense of circular polarized light that is reflected, the light being provided along a common light path for viewing by discriminating based on polarization characteristics.

Another aspect relates to a stereo display including two image generators at an obtuse angle relative to each other and a beam splitter at the bisectrix of the obtuse angle.

Another aspect of the invention relates to a display system comprising a pair of displays, each having a polarized light output, the polarization for both displays being the same, the displays being at an angle to each other, a beam splitter so positioned relative to the two displays at the bisectrix of said angle to combine images from the displays without changing polarization, and a polarization rotator between one of the displays and the beam splitter, whereby one image is transmitted by the beam splitter and the other image is reflected by the beam splitter to provide for viewing of images from the displays such that the images can be separated based on polarization.

Another aspect of the invention relates to a display system comprising a pair of displays, each having a polarized light output, the polarization for both displays being the same, the displays being at an angle to each other, and a beam splitter so positioned relative to the two displays at the bisectrix of said angle to combine images from the displays whereby one image is transmitted by the beam splitter and the other image is reflected by the beam splitter to provide direct view of images from the displays such that the images can be separated based on polarization.

Another aspect relates to a method of displaying stereo images, comprising simultaneously displaying a left image on a display and a right image on another display such that the left and right images have optical polarization in the same direction, rotating the plane of polarization of light from one of the displays, and using a beam splitter so positioned relative to the two displays that one can be viewed directly through the beam splitter and the other can be viewed by reflected light from the beam splitter combining those images in a common light path without changing polarization, whereby the optical polarization of the left image portion and the right image portion are different in such common light path such that the image portions can be separated based on optical polarization.

Another aspect relates to a method of displaying stereo images, comprising simultaneously displaying a left image on a display and a right image on another display such that the left and right images have the optical polarization in the same direction, and using a beam splitter so positioned relative to the two displays that one can be viewed directly through the beam splitter and the other can be viewed by reflected light from the beam splitter combining those images in a common light path such that the optical polarization of the left image portion and the right image portion are different in such common light path such that the image portions can be separated based on optical polarization.

Another aspect relates to a method of presenting a stereoscopic image for viewing, comprising presenting a left eye image on a display, presenting a right eye image on another display that is at an angle relative to the first mentioned display, both said presenting steps presenting such images having optical polarization in the same direction, rotating the plane of polarization of one of such images, and using a beam splitter that is so positioned relative to the two displays combining in a substantially common light path the respective images without rotating the plane of polarization such that the respective images in the common light path have different optical polarization, whereby the images can be separated based on polarization so that one image can be viewed directly through the beam splitter by one eye and the other can be viewed by reflected light from the beam splitter by the other eye.

Another aspect relates to a stereo display comprising two image generators at an obtuse angle relative to each other, a beam splitter at the bisectrix of the obtuse angle and a polarization rotator optically between one of the image generators and the beam splitter.

Another aspect relates to a display system including a pair of displays operable to provide images as respective stereo pairs that have plane polarization in the same direction, the displays being at an obtuse angle to each other, a beam splitter so positioned relative to the two displays at the bisectrix of said angle to combine images from the displays without changing optical polarization, and a polarization rotating device between one display and the beam splitter, whereby one image is transmitted by the beam splitter and the other image is reflected by the beam splitter to provide direct view of images from the displays.

Several other aspects of the invention may include one or more of the following: Tuning of a display system that includes several displays, the images of which are combined by a beam splitter, to adjust the brightness or intensity of light from one or more of the respective display to accommodate differential light transmission or reflection by the beam splitter; use of a coating to provide a polarizing sensitivity and/or differential reflection/transmission characteristics to a beam splitter; use of a pair of same displays in a display system that includes a polarizing beam splitter; and use of a pair of twisted nematic displays having the same polarization direction for light provided thereby in a display system that includes a polarizing beam splitter. These aspects may be used alone or in combination with other aspects in the several display systems and viewing systems hereof and equivalents thereof.

To the accomplishment of the foregoing and related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be suitably employed.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

Although the invention is shown and described with respect to one or more embodiments, it is to be understood that equivalents and modifications will occur to others skilled in the art upon the reading and understanding of the specification. The present invention includes all such equivalents and modifications, and is limited only by the scope of the claims.

Also, although various features are described and are illustrated in respective drawings/embodiments, it will be appreciated that features of a given drawing or embodiment may be used in one or more other drawings or embodiments of the invention.

BRIEF DESCRIPTION OF THE DRAWINGS

In the annexed drawings a number of embodiments in which polarization is affected by reflection are illustrated in FIGS. 1-18, and embodiments in which polarization is not affected by reflection are illustrated in FIGS. 19-22. Some features from one group of embodiments may be used with the other group of embodiments, as was mentioned just above.

DESCRIPTION

Figure 19:
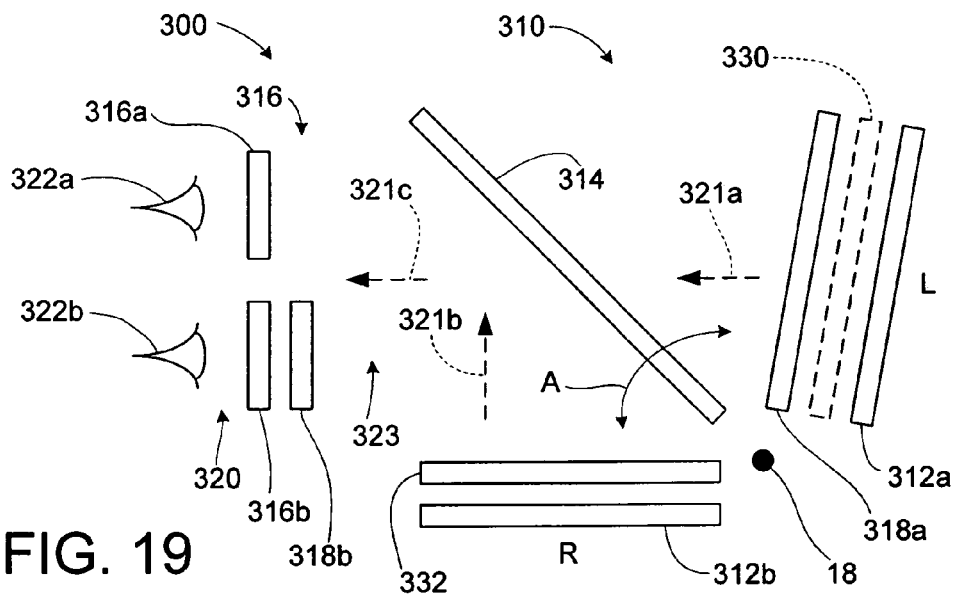
FIGS. 19 and 20 are, respectively, side and perspective schematic views of a display system in which plane of polarization is not changed by reflection by the beam splitter thereof, the system including optical retarders.
Figure 20:
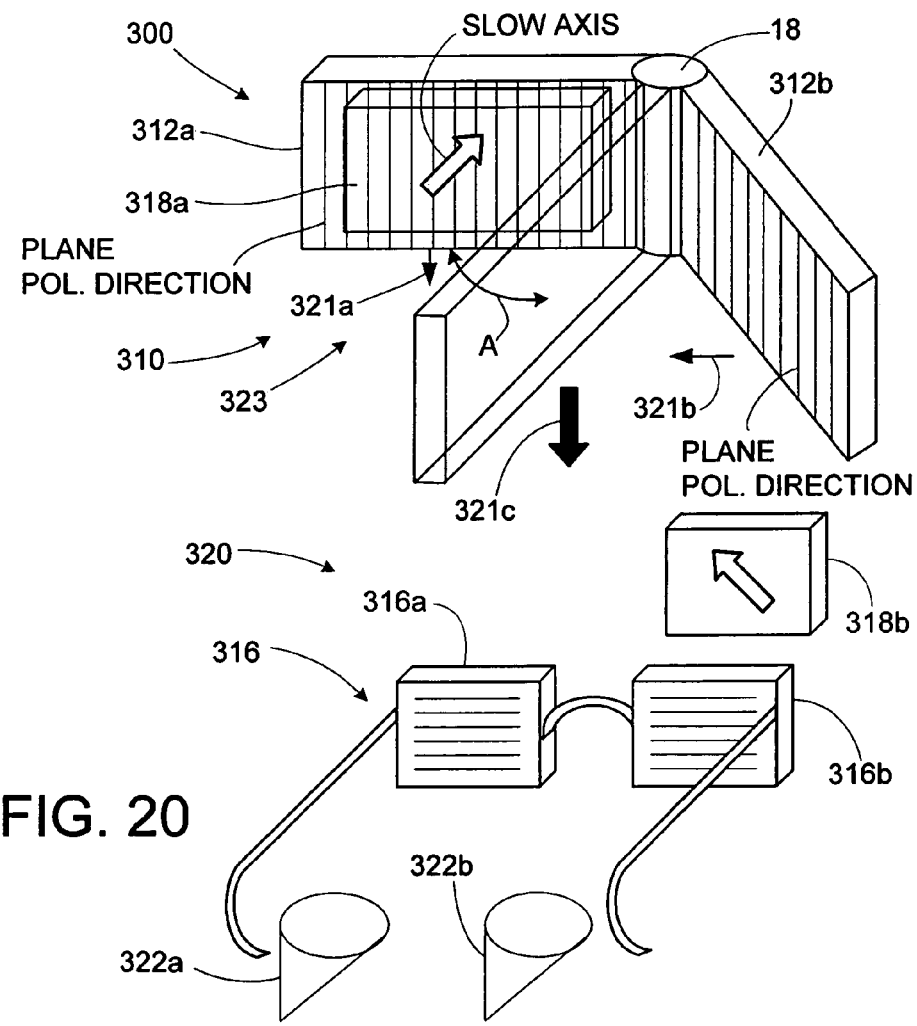

According to an aspect of the invention, which is illustrated in and described with respect to FIGS. 19 and 20, the images representing one stereo pair, e.g., to form a stereo or 3-D still image, or more stereo pairs than one, e.g., a sequence as in a stereo or 3-D movie, are provided in respective first and second display channels (sometimes referred to as display light paths or display optical paths). The images are formed by, or are established by, plane polarized light, and the plane of polarization (sometimes referred to as the direction of the plane polarization or the polarization direction) e.g., relative to a reference direction, such as horizontal, vertical, etc., is the same. A first optical retarder, e.g., a half wave plate or other retarder arrangement, in the first display channel rotates the plane of polarization of light in that display channel by 90 degrees (90°). A beam splitter or other device, which combines light from two incident directions and provides the combined light along a common light path, e.g., by reflection and transmission, respectively, of the respective incident light from the two incident directions, receives the images from the first and second display channels and provides the images to a common light path without affecting polarization. A viewing device to view the stereo pair images has first and second viewing channels (sometimes referred to as viewing light paths or viewing optical paths), which correspond to the first and second display channels, for viewing light received via the common light path from the first and second display channels, respectively. A second optical retarder, e.g., a half wave plate or other optical retarder arrangement in the second viewing channel rotates the plane of polarization of light received in that display channel from the common light path by 90 degrees (90°) and also compensates for optical dispersion effects in the first optical retarder and, therefore, balances the components and/or optical effects in the two channels. The respective images of stereo pairs may be viewed in or from the first and second viewing channels to provide a stereo or 3-D image.

Figure 21:
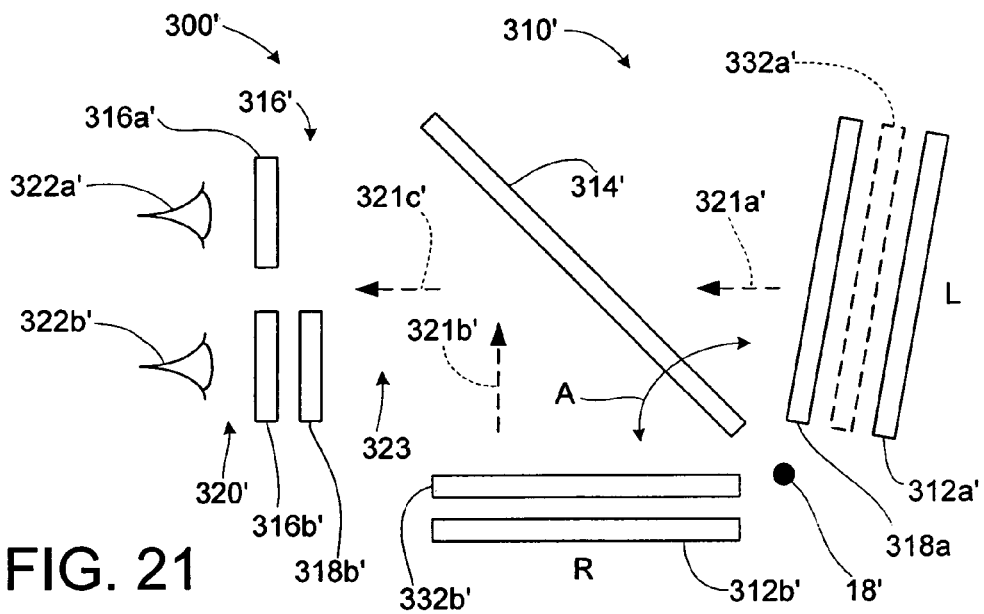
FIGS. 21 and 22 are, respectively, side and perspective schematic views of a display system in which a polarization sensitive beam splitter is used and the plane of polarization is not changed by reflection by the beam splitter.
Figure 22:
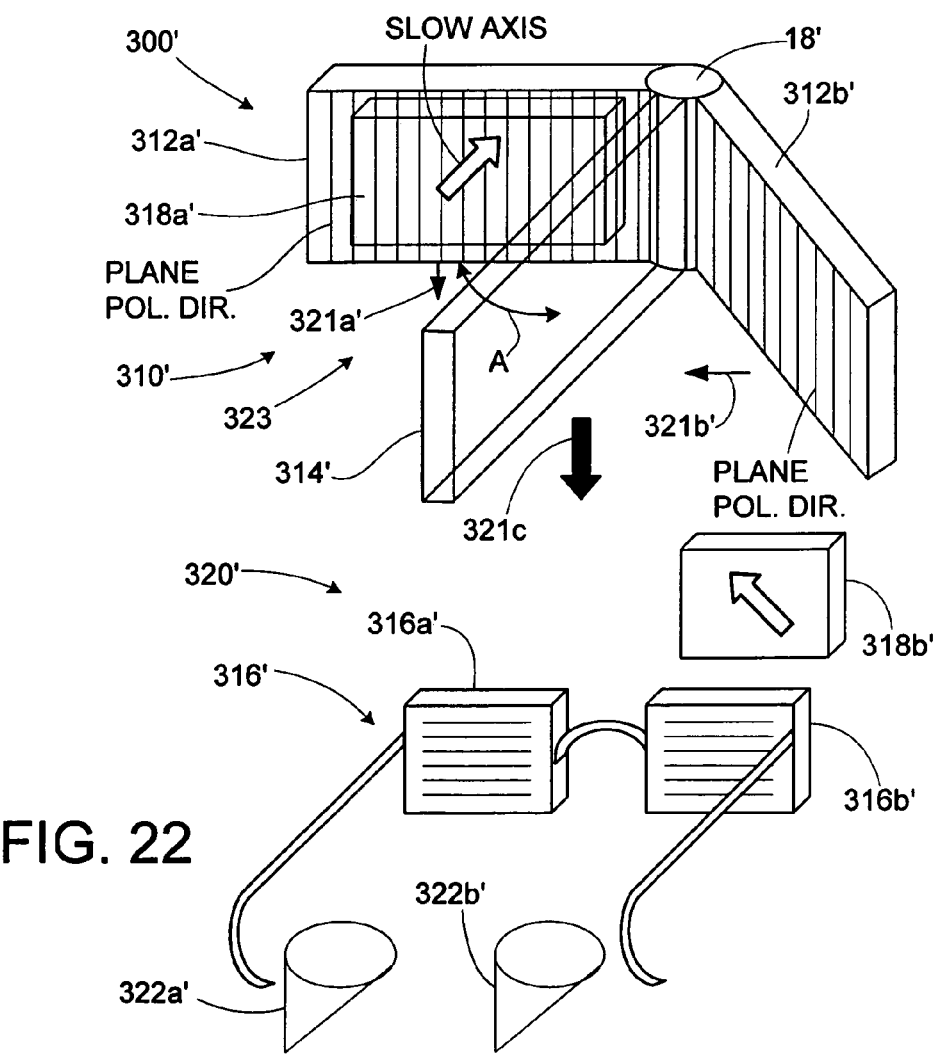

According to an aspect of the invention, which is illustrated in and described with respect to FIGS. 21 and 22, the images representing one stereo pair, e.g., to form a stereo or 3-D still image, or more stereo pairs than one, e.g., a sequence as in a stereo or 3-D movie, are provided in respective first and second display channels (sometimes referred to as display light paths or display optical paths). The images are formed by, or are established by, plane polarized light, and the plane of polarization (sometimes referred to as the direction of the plane polarization or the polarization direction) e.g., relative to a reference direction, such as horizontal, vertical, etc., is the same. A beam splitter or other device, which combines light from two incident directions and provides the combined light along a common light path, e.g., by reflection and transmission, respectively, of the respective incident light from the two incident directions, receives the images from the first and second display channels and provides the images to a common light path without affecting polarization. Other arrangements may be used to provide the beam splitter images from the displays, respectively, having crossed directions of optical polarization. For example, if the displays themselves provide plane polarized light output, they may be arranged or be of a type such that the directions of plane of polarization of light from the respective displays is crossed, e.g., is at 90 degrees to each other. Respective crossed plane polarizers may be used to obtain such relationship of polarized light incident on the beam splitter from displays that do not provide plane polarized light output. In the case that the light representing or forming images incident on the beam splitter has crossed plane polarization, and the direction of plane of polarization of light representing (forming) one of those images is parallel to the plane of the beam splitter, then the beam splitter need not be of the non-polarization or non-polarizing type. It could be of a type that is of the polarizing type that preferentially reflects or transmits light based on the direction of plane of polarization of incident light, for example, of non-normal incident light. For example, non-normal incident light that has a direction of plane of polarization that is parallel to the plane of the beam splitter may tend to have a large percentage of such light reflected by the beam splitter than the percentage of such light that is transmitted by the beam splitter, whereas the light having relatively crossed direction of polarization (e.g., crossed relative to the direction of the plane of polarization of the first-mentioned light) may preferentially be transmitted through the beam splitter compared to such light that is reflected by the beam splitter.

Using a polarization sensitive beam splitter, as was mentioned just above, (sometimes referred to as a polarizing beam splitter) the preferential light transmission or light reflection characteristic of the beam splitter can be used to increase the brightness or contrast of the images that are respectively transmitted or reflected via the beam splitter for viewing, while reducing the light that in a sense is wasted by being transmitted or reflected to an areas that is not ordinarily viewed.

A viewing device discriminates or distinguishes between the stereo pair images based on optical polarization. The viewing device may have first and second viewing channels (sometimes referred to as viewing light paths or viewing optical paths), which correspond to the first and second display channels, for viewing light received via the common light path from the first and second display channels, respectively. The respective images of stereo pairs may be viewed in or from the first and second viewing channels to provide a stereo or 3-D image.

Polarization BEING Affected by Reflection.

According to an exemplary embodiment, the invention includes two flat panel displays which are arranged at an angle relative to each other, for example, at 90 degrees or approximately 90 degrees and a beam splitter which is positioned at the bisectrix of the angle between the two displays. The angle at which the displays are arranged relative to each other may be different, e.g., larger than 90 degrees, for example, an obtuse angle. As an example of a bisectrix, consider two flat panel displays, the planes of which are parallel with the same linear axis; thus, for example, the two planes may be arranged similar to the front and back covers of a book, with the spine of the book representing the axis. The bisectrix would be an angle that bisects the angular relation of the two planes (displays or book covers); and, for example, the bisectrix would be a plane that also is parallel to the linear axis (e.g., like the book spine) and bisects the angle equally between the first two mentioned planes (e.g., the displays). As is described further below the images from both displays may be viewed; and if the images provided thereby are, respectively, left and right eye images, which can be discriminated, e.g., by polarized lenses or some other means, a stereoscopic (3D) display (monitor) is obtained and stereo (3D) images produced thereby may be viewed.

If the flat panel displays are liquid crystal displays, the light output of each display will be polarized. The usual polarization direction for many active matrix displays, for example, is at 45 degrees to the edge of the display. This characteristic of such liquid crystal displays allows the present invention to be carried out with relative efficiency and minimum parts.

When linear polarized light (also referred to herein as plane polarized light, for example) is reflected from a surface that is in a plane which is perpendicular or transverse to the direction of incident light, it does so without a change in direction of polarization. However, if the reflecting surface (in this case the beam splitter) is set at an angle to the surface of one of the liquid crystal displays such that the reflected image changes direction by 90 degrees or approximately 90 degrees and the direction of polarization is at 45 degrees to the change of direction, the result will be that the linear polarized light will appear to have rotated 90 degrees. As an example, consider two adjacent flat panel displays, each in a vertical plane, the two meeting at and including a common linear axis and being oriented so the displays are at 90 degrees relative to each other, and each display providing a light output that is polarized in the same direction, e.g., from the lower left toward the upper right of the respective display, say at an angle of 45 degrees relative to horizontal or vertical (not considering sign). The beam splitter is oriented between the displays, has its plane (or an extension thereof) intersecting the linear axis mentioned, and is at an angle of 45 degrees relative to each display; and the beam splitter is so positioned relative to the two displays that one can be viewed directly through the beam splitter and the other can be viewed by reflected light from the beam splitter to provide a virtual image, e.g., a reflected image, of the latter display.

If the two displays are positioned with respect to the beam splitter such that the virtual image of one display, e.g., the image provided by that display, is exactly superimposed on the other, the beam splitter will reflect the angle of the polarization vector at right angles to the display which is not reflected. Consider as an example the polarization direction of light incident on the beam splitter intended for reflection to be represented by an arrow pointing in the direction of polarization; the reflected light from the beam splitter will present the mirror image of the arrow, and, therefore, the arrow will appear to a viewer to be at 90 degrees (crossed) relative to the original polarization of the incident light on the beam splitter (and, thus, also crossed relative to the polarization direction of light transmitted directly through the beam splitter from the other display). Therefore, the reflected image from the beam splitter and the direct image viewed through the beam splitter have linear polarization directions that are at right angles; and this can be accomplished without additional elements.

If an electronic signal is received by the respective displays corresponding to the left and right image, those images can be displayed separately on the two liquid crystal display panels, e.g., the left image on one display and the right image on the other display. They can be seen by the left and right eye in the proper order by using glasses which are linearly polarized at right angles to each other and parallel to the image that is intended for the left or right eye. One eye sees a display through the beam splitter and the other eye sees the other display by reflection from the beam splitter.

Although the invention is described using liquid crystal displays (LCDs), it will be appreciated that the invention may use other displays or image generators, provided the light output from the displays is polarized or is given polarization characteristics, e.g., by using one or more polarizers in the light path. For convenience of description and to avoid adding unnecessary verbiage, the image generators or displays are considered and described herein as active matrix LCDs, but it will be appreciated that other displays or image generators may be used.

It may be desirable at times to use circular polarized light to separate the two images mentioned above. This can be done in several ways, two of which are mentioned here by way of example. The first is by putting quarter wave plates at both image generators, such as the LCDs, with their slow axis horizontal or vertical on each of the LCDs. More generally, the slow axis of the quarter wave plates is at 45 degrees to the polarization direction of linear polarized light from the respective LCDs. This continues to maintain the same structure on both displays. When the circular polarized light is reflected from the beam splitter it reverses its sense; thus, right circular polarization becomes left circular polarization. A second way of achieving two circular polarizations is to place a quarter wave plate at the exit bezel or a location optically downstream of the two LCDs and beam splitter so that both the direct view image and the virtual image light go through the quarter wave plate and become circularly polarized. Thus, the slow axis is at 45 degrees to the two polarizations which were generated and provided by reflection or transmission at the beam splitter.

Circular polarizers are generally produced by bonding a quarter wave plate to a linear polarizer such that the linear polarizer is toward the observer. The quarter wave plate converts right-handed circular polarized light to linear polarized light, and it converts left-handed circular polarized light to linear polarized light, except the polarization directions of the two linear polarized lights are at right angles to each other. Since most circular polarizers which use quarter wave plates are tuned for green light, they are not perfect. In order to achieve a higher performance the circular polarizer may be mounted so that the polarized direction of the linear polarizer at the output is perpendicular to the linear polarization at the display for the nullification of the transmitted image. For the reflected image the direction should be parallel for the linear polarization at the polarizer and display respectively.

The information is presented to the displays of the invention such that the information in one display is a mirror image so that its reflection from the beam splitter is a normal image. This is normally done electronically but it can be accomplished by how the video signal is brought into the display, e.g., a flat panel display or other display. For displays that are mounted vertically the reflected display can be scanned from right to left instead of left to right. Depending upon the signal the video signal can be reversed either line at a time or frame at a time.

The invention has additional useful features. By displaying normal video images which are field sequential one field can be displayed on one display and the other field on another, thus allowing a signal from both fields to be present at one time. This arrangement reduces motion artifacts since both fields are simultaneously displayed. The liquid crystal display continuously may hold the image until it is changed. This also makes possible the display of HDTV images which are based on field sequential at half the bandwidth in each display. A further advantage in this form of mixing is an improvement in the color separation. The color in many flat panel displays is based on vertical lines of red, green, blue and white. When they are reflected they go from white blue green and red thus giving a different order to the colors in reflection. This reduces color borders and other artifacts caused by the color sequence above.

The present invention has the ability to display images in three dimensions and also has the ability to improve the resolution and color artifacts of flat panel monitors.

Description with Reference to the Drawings.

Figure 1:
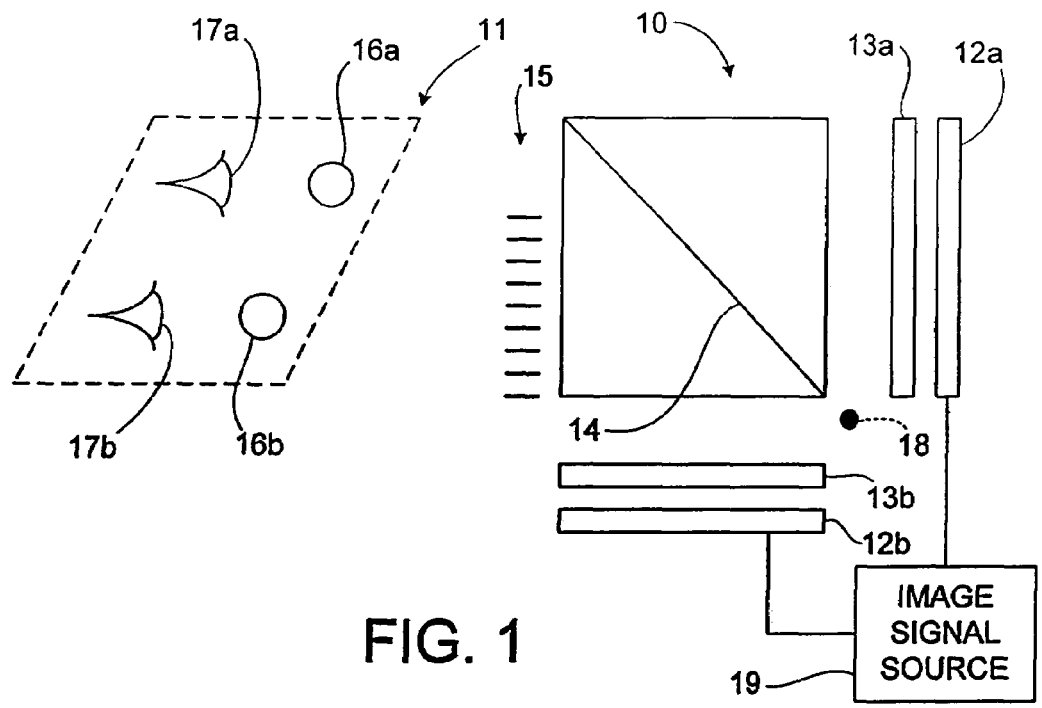
FIG. 1 is a schematic illustration of a viewing system including a display system, sometimes referred to as a monitor or monitor system, for showing high-resolution and three-dimensional images using plane polarized light in accordance with the invention and of a viewer viewing such images.

Referring to the drawings wherein like reference numerals designate like parts in the several figures, and initially to FIG. 1, a monitor for showing high-resolution and three-dimensional images is generally illustrated at 10 being viewed by an individual 11 as a viewer of images provided or shown by the monitor. As used herein, the term "monitor" may include a system of several displays, a system of several displays and associated circuitry and/or software, etc. and/or a single display—for shorthand convenience any of these terms and functions may be used equivalently and interchangeably with distinctions, if appropriate, being provided by context. The monitor 10 includes a pair of liquid crystal displays 12a, 12b and a pair of linear polarizers 13a, 13b. The displays 12a, 12b may have integral polarizers, as in active matrix displays, in which case separate polarizers 13a, 13b would be unnecessary. The displays 12a, 12b and polarizers 13a, 13b provide linear polarized light images to a beam splitter 14 of the monitor 10. The image from the display 12a and polarizer 13a is viewed directly by the viewer 11 as light therefrom is transmitted directly through the beam splitter 14. The image from the display 12b and polarizer 13b is reflected by the beam splitter toward the viewer 11; the direction of polarization of the linear polarized light provided from the display 12b and polarizer 13b is rotated 90 degrees due to the mirror image effect described above so that the light 15 reaching the viewer 11 includes two images, one from each display 12a, 12b and the polarization directions of the linear polarized light representing such images are crossed, e.g., at 90 degrees to each other, as was described above. The viewer 11 uses linear (plane) polarizers 16a, 16b to view by his or her eyes 17a, 17b the left and right eye images from the monitor 10. The polarizer 16a, for example, transmits linear polarized light from a respective display, e.g., display 12a, which is intended to be viewed by the left eye of the viewer; and the polarizer 16b, for example, transmits linear polarized light from the other display, e.g, display 12b, providing the right eye image to the right eye of the viewer 11. The beam splitter 14 is shown as a prism beam splitter, but it will be appreciated that other types of beam splitters may be used; many are well known in the art.

It will be appreciated that the monitor 10 of FIG. 1 has its parts arranged as was described above. For example, the displays 12a, 12b may be flat panel displays which are arranged in a vertical, horizontal, or some other common direction, and the planes thereof are parallel with an imaginary linear axis 18 which extends in a direction perpendicular to the plane of the drawing relative to the illustration of FIG. 1. Also, the eyes of the viewer 11 are shown somewhat in perspective relative to the drawing, as they typically would be aligned in parallel with the axis 18 for optimum viewing, although some off-axis alignment may be acceptable.

An image signal source 19 is illustrated. Such source may be a video source, a computer, a tape player or CD Rom player, etc. The image signal source may be remote and the image signal may be provided via a network or the like. The image signal source provides signals to the displays 12a, 12b as a usual video circuit or video card provides signals to a display to create images for viewing. If desired, the image signal source 19 may include circuitry for reversing the direction of scanning or reversing the image being provided to a respective display, as was mentioned above.

Figure 2:
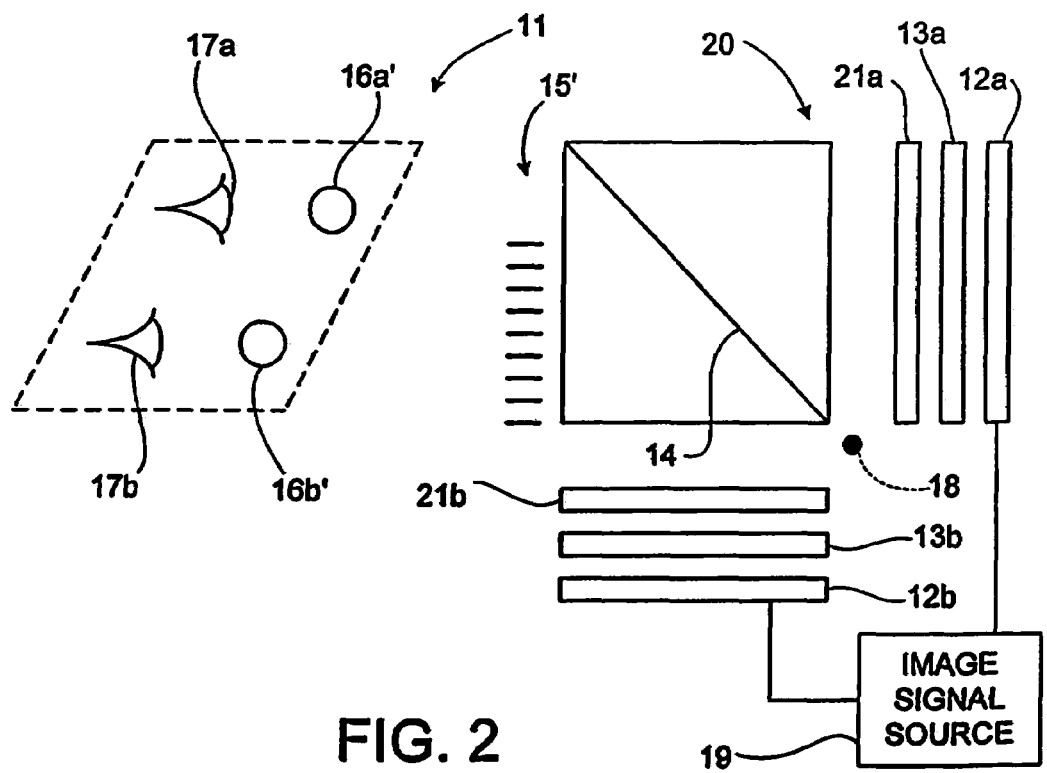
FIG. 2 is a schematic illustration of a monitor for showing high-resolution and three-dimensional images using circularly polarized light in accordance with the invention and of a viewer viewing such images.

Turning to FIG. 2, another monitor for showing high-resolution and three-dimensional images is illustrated generally at 20. The monitor 20 is similar to the monitor 10, except the monitor 20 uses circular polarized light. Accordingly, respective quarter wave plates 21a, 21b are provided to convert linear polarized light from the respective displays 12a, 12b and, if used, linear polarizers 13a, 13b, to circular polarized light. The light output 15' may include both left and right circular polarized light, and the circular polarizers 16a', 16b' respectively transmit one or the other of such left or right circular polarized light to respective eyes 17a, 17b of the viewer 11 for viewing respective left and right eye images. Although the direction of circular polarization of light incident on the beam splitter from the two displays 12a, 12b may be the same, the beam splitter reverses the direction of circular polarization of the light it reflects from the display 12b, as was described above. The circular polarizers 16a', 16b' can distinguish or discriminate between the left and right circular polarized light to provide respective images to the eyes 17a, 17b of the viewer 11.

Figure 3:
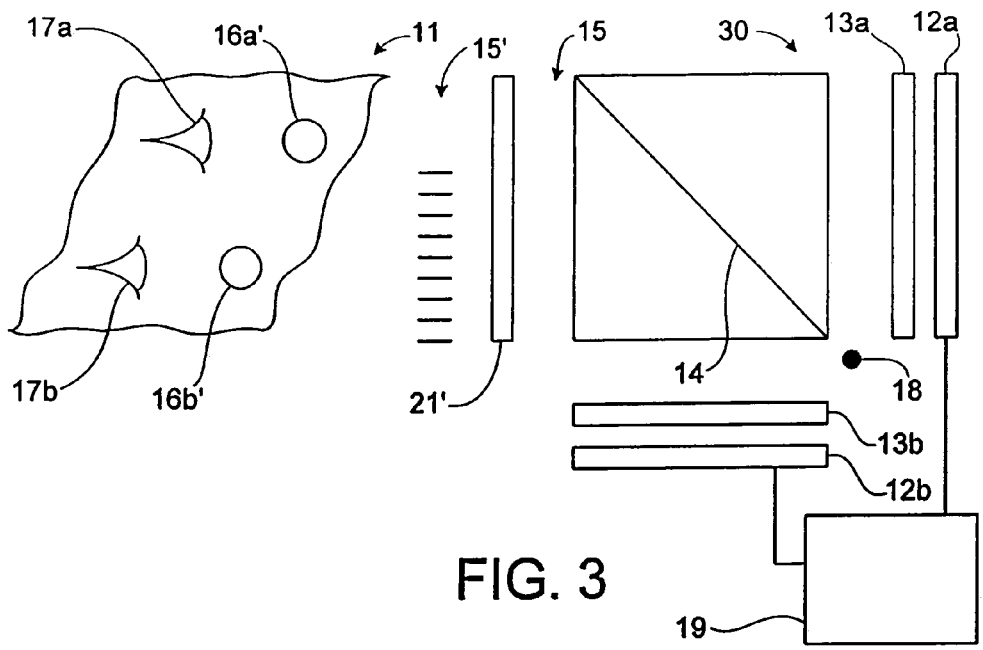
FIG. 3 is a schematic illustration of another embodiment of a monitor for showing high-resolution and three-dimensional images using circularly polarized light in accordance with the invention and of a viewer viewing such images.

Referring briefly to FIG. 3, another monitor for showing high-resolution and three-dimensional images is illustrated generally at 30. The monitor 30 is similar to the monitor 20, except the monitor 30 uses only one quarter wave plate 21' to obtain both left and right circular polarized light from the respective linear polarized light inputs thereto from the displays 12a, 12b, linear polarizers 13a, 13b (if used), and beam splitter 14. The quarter wave plate is arranged relative to the polarizers 13a, 13b or the direction of linear polarized light so the slow axis is at 45 degrees relative to the direction or plane of such linear polarization.

Figure 4:
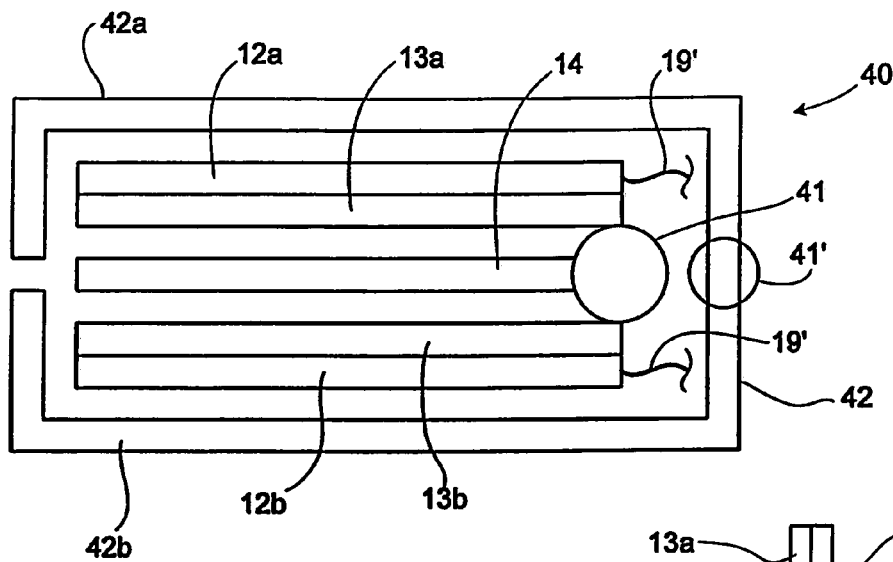
FIG. 4 is a schematic illustration of an embodiment of monitor of the invention in folded condition.
Figure 5:
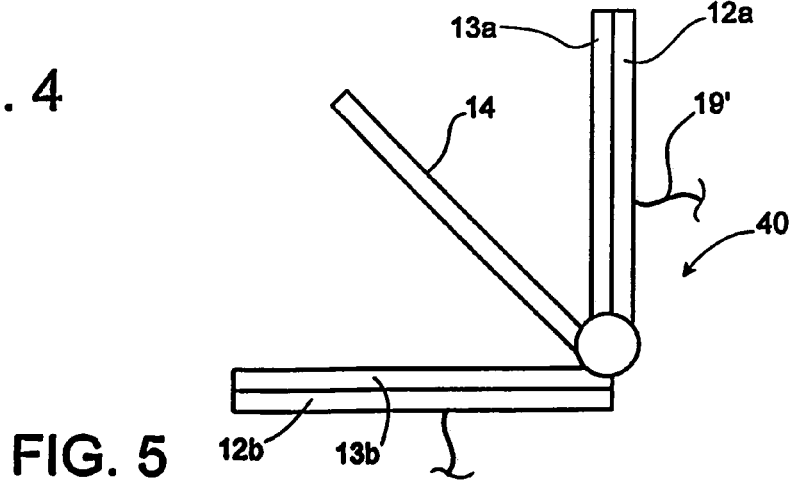
FIG. 5 is a schematic illustration of the embodiment of monitor of the invention of FIG. 4, here shown in partly open condition.
Figure 6:
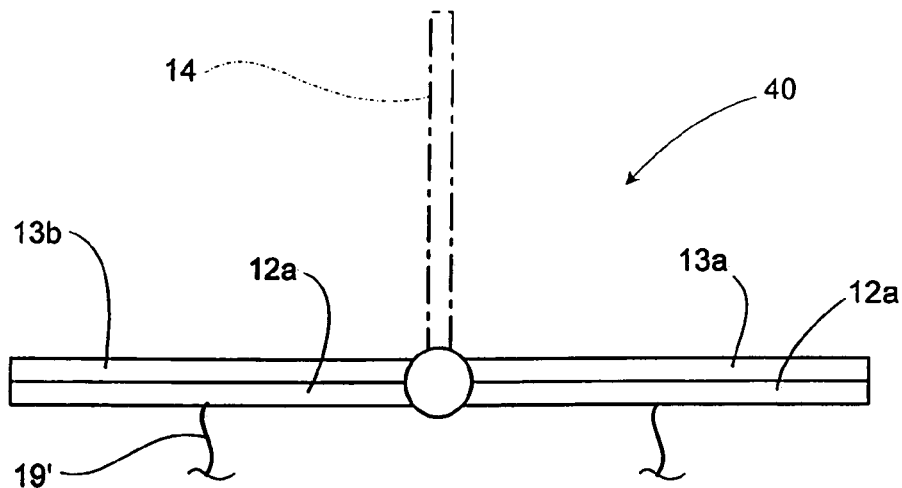
FIG. 6 is a schematic illustration of the embodiment of monitor of the invention of FIGS. 4 and 5, here shown in fully open condition.

Turning to FIGS. 4, 5 and 6 a packaged monitor for showing high-resolution and three-dimensional images and, alternatively, for showing multiple images in parallel, is shown generally at 40. In FIG. 4 the monitor 40 is in closed condition; in FIG. 5 the monitor 40 is in partly open condition; and in FIG. 6 the monitor 40 is in full open condition. The monitor 40 includes a hinge 41 relative to which the displays 12a, 12b, linear polarizers 13a, 13b, and beam splitter 14 are mounted. In FIG. 4 those components are pivoted on or relative to the hinge 41 and to each other to assume a relative compact nested arrangement, e.g., for storage in a minimum space. A protective cover or package 42, including cover portions 42a, 42b, possibly hinged at 41', as illustrated in FIG. 4, may be placed over those components to avoid damage while in stored condition. Connections 19' may be provided to couple the displays to an image signal source or, if desired, the image signal source may be appropriately mounted in the package 42.

As is illustrated in FIG. 5, the monitor 40 includes the displays 12a, 12b, linear polarizers 13a, 13b (and quarter wave plates, if used), and beam splitter 14 arranged in partially open condition relative to the stored condition; this partially open condition is obtained by rotation or pivoting relative to the hinge 41. If desired appropriate stops may be used to help align the components relative to each other in orientation similar to that described above with respect to FIGS. 1-3.

As is illustrated in FIG. 6, the monitor 40 includes the displays 12a, 12b, linear polarizers 13a, 13b (and quarter wave plates, if used), and beam splitter 14 arranged in fully open condition relative to the stored condition; this fully open condition has the displays 12a, 12b oriented in adjacent parallel relation so both can be viewed side by side to present increased amount of information to the viewer. Such orientation is obtained by rotation or pivoting relative to the hinge 41. If desired appropriate stops may be used to help align the components relative to each other as illustrated in FIG. 6.

Thus, it will be appreciated that the monitor 40 may be used to provide either stereo views, large area mono views of respective images or side by side views of stereo or mono images as is described and illustrated herein. Furthermore, the invention provides a device for not only displaying three dimensions but also improving the resolution and color artifacts of flat panel monitors.

The various methods of using the invention are described above. Summarizing, though, it will be appreciated that using the invention, e.g., as illustrated in FIGS. 1-3 and 5, two images are provided and can be discriminated by polarization characteristics to obtain respective images for viewing. The two images may be provided simultaneously without the need to provide frame or field sequential images or time sequential images (e.g., one image for viewing by one eye and the next image or viewing by the other eye, and so forth); thus, increased resolution and reduction of flicker can be obtained. Further, if desired, using the invention as illustrated in FIG. 6, large area display may be obtained by displaying respective images on adjacent displays 12a, 12b, for example.

Figure 7:
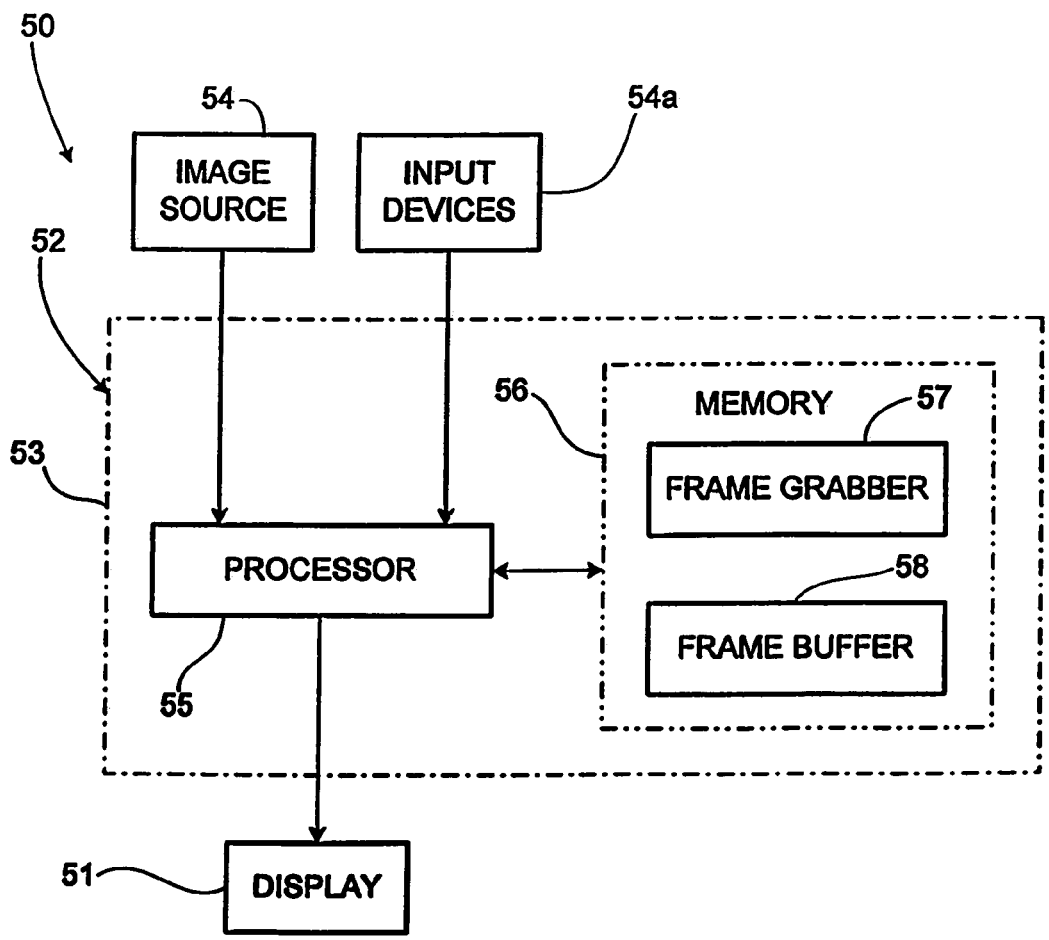
FIG. 7 is a schematic illustration of a display system according to an embodiment of the invention.

Turning to FIG. 7, a system for implementing the invention is illustrated at 50. The system 50 includes a display 51, such as the monitors 10, 20, 30, 40 described above. The system 50 also includes an image signal source 52 to provide appropriate signals to the display 51 to create images for viewing. The image signal source 52 includes, for example, a computer 53 and an image source 54. The image source 54 contains information or provides information to the computer 53 which supplies signals to the display 51 to create images for viewing. The image source may be, for example, a video source, a tape player, a CD-ROM player, a connection to a network to receive signals from a remote device, or a computer program, for example, which is operable on the computer 53 to develop images, such as for playing a game, for presenting architectural or mechanical drawings, etc. Also associated with the computer 53 are input devices 54, such as a keyboard, mouse, pointing device, or some other input signal providing mechanism to provide inputs to the computer to operate the same in a desired fashion.

The computer 53 includes a processor 55 and a memory 56. The processor may be a conventional microprocessor, such as, for example, one from Advance Micro Devices sold under the trademark ATHALON or one sold under the trademark K-6, a microprocessor sold by Intel Corporation under the trademark PENTIUM, or another processor. The memory 56 may include non-volatile memory, such as ROM, CD-ROM, DVD, etc. and/or volatile memory, such as random access memory. Portions of the memory 56 may be designated as illustrated as a frame grabber 57 and as a frame buffer 58.

It will be appreciated that the several parts of the computer 53 described herein are exemplary. Other components, such as processors, memories, input/output devices, commonly used, currently available, and/or that may be developed in the future may be used to carry out various functions disclosed and described herein in accordance with the present invention and, thus, are equivalents of the illustrated and described exemplary embodiment.

Signals representing an image or characteristics of an image are provided the processor 55. Those signals may be supplied via the image source 54 or, if desired, the image source 54 may be part of the memory 56, such as a CD-ROM, DVD or some other device included in or coupled to the computer 53 to provide the image information. In many display systems images are presented on a display, such as the display 51, as a series of sequentially presented frames. Signals representing a given frame, say from the image source 54, may be provided by the processor 55 to a frame grabber 57. The frame grabber may be a portion of the memory 56 selected to grab or to accumulate the information related to a given image frame. If the image signals include stereoscopic images, for example, a left image and a right image, sometimes referred to as a stereo pair, the frame grabber 57 may include two respective portions, one for grabbing and storing the left image and one for grabbing and storing the right image of a given frame or pair of frames for a given stereoscopic image. The frame buffer 58 is provided with the image signals, for example, on a bit mapped basis, and supplies those signals via the processor 55 to the display 51 for viewing by a viewer. The frame buffer 58 may include two portions, for example, one that stores the left image and one that stores the right image, and the processor directs the respective image information to the respective displays 12a, 12b (FIG. 1), for example.

Summarizing operation of the system 50, the processor 55 receives the image signals from an image source and supplies corresponding data representing a given frame or pair of frames to the image grabber 57. When the data representing a given image or pair of images (left and right images) in the frame grabber 57 has been completed, the processor stores the frame data in the frame buffer 58 and from the frame buffer 58 the processor either directly or via an appropriate output circuitry, such as a VGA card or the like, to the display 51 for presentation to and viewing by a viewer 11. Various techniques may be used to obtain the image data and to provide it to the frame buffer 58. It may be unnecessary to use a frame grabber 57 in which case the image data may be supplied from some image source 54 via the processor 55 directly to the frame buffer, for example. Other devices may be used, too, to obtain image data, to process the data and to provide it to the display 51, the computer 53 being only one example of such a device and method.

As was mentioned above, the image provided by the display 12b (FIGS. 1, 2 and 3) is reflected by the beam splitter 14 and provided as part of the output light 15. Such reflected image in a sense is a virtual image because it is reversed due to the reflection by the beam splitter. Also, as was mentioned above, the image presented by the display 12b is inverted so that when it is reflected by the beam splitter 14, the reflected virtual image and the image from the display 12a, which is transmitted through the beam splitter 14 will be substantially superimposed in proper relation to allow viewing of a stereoscopic image by a viewer 11. Such inverting of the image presented by the display 12b may be accomplished in a number of different ways, several of which are described here and others which may be equivalents also may be used. For example, the device which obtains the image data for the display 12b, such as a video camera, charge coupled device (CCD), etc., may be operated to perform its scanning in the reverse direction relative to the usual direction of scanning so that the data provided the frame buffer 58 and the display 12b when presented in the usual scan direction would be reversed.

Alternatively, the image data provided the frame buffer 58 by the processor 55 for delivery to the display 12*b* may be inverted electronically prior to being stored in the frame buffer 58. In the latter case, an example would include the frame grabber 57 receiving image data for the left image and right image of a given frame and that data subsequently is stored in the frame buffer 58, but prior to being stored in the frame buffer 58, the image data for one of the frames is inverted. A further possibility is to store the image data for the left and right images of a given frame in the frame buffer 58 and when delivering that data to the respective displays 12*a*, 12*b*, inverting the data provided to the display 12*b* essentially in real time as it is provided thereto.

Figure 8A:
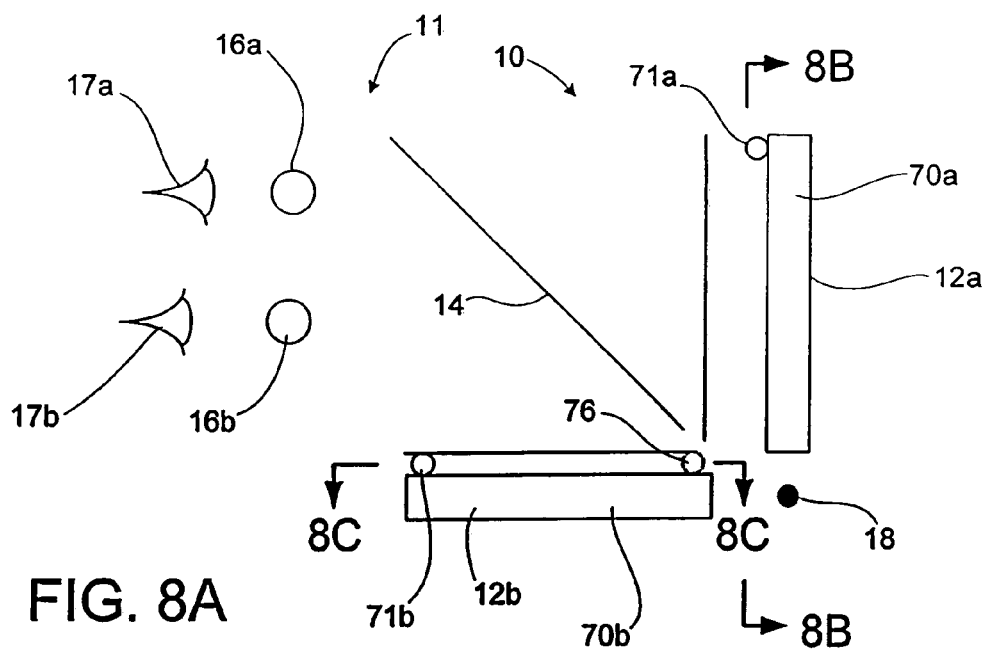
FIGS. 8A, 8B and 8C are schematic illustrations of an embodiment of the invention illustrating the reversal or inversion of images of one of the respective displays in the monitor of the invention.
Figure 8B:
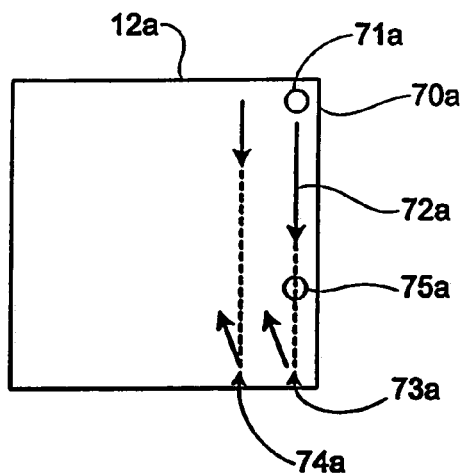

The image inverting described above is shown schematically in FIGS. 8A, 8B and 8C. FIG. 8A is similar to FIG. 1 showing the monitor 10, displays 12*a*, 12*b*, and the beam splitter 14. FIG. 8B is a plan view of the display 12*a* as it is seen by the viewer 11. The top 70*a* of the display 12*a* is at the right hand side of the illustration in FIG. 8B. Relative to the point of view of the viewer 11 looking at the monitor 10 and seeing through the beam splitter 14 the image presented by the display 12*a*, a point, pixel, component of the image, etc., at the upper left corner of the display 12*a* is represented by a solid line circle 71*a*. In FIG. 8B the direction of scanning image data or providing the image data to the display 12*a* is represented by the arrows 72*a*. Although the providing of image data to a given line 73*a*, 74*a*, etc., of the display 12*a* is referred to as a scan direction, in many liquid crystal display devices all of the image data is presented to a given line at a single time. All the image data to an entire display may be provided simultaneously or substantially simultaneously directly from the frame buffer. Direction of scan, though, sometimes is referred to with respect to some CRT (cathode ray tube) devices. Regardless of how the data is presented, though the data at the location 71*a* of the display 12*a* is seen at the upper left corner of it as viewed by the viewer 11. The data or image representing the data at a location 75*a* is seen part way across the scan line, line of pixels, etc., of the display 12*a* near the top 70*a* thereof. Other data also may be provided to pixels of the display 12*a* to present image information for viewing by the viewer 11.

Figure 8C:
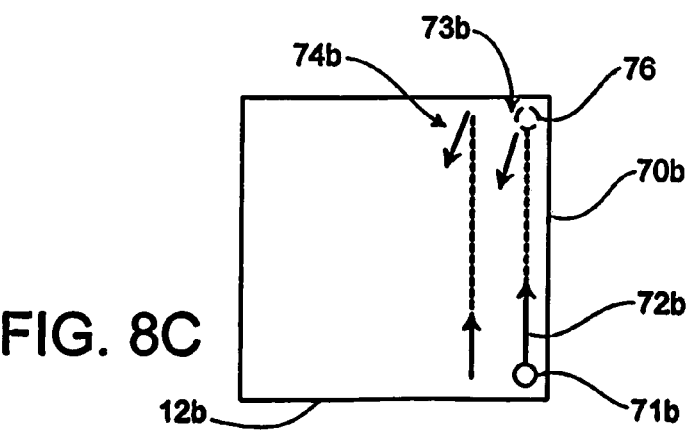

To demonstrate the reversing of the image information presenting on the display 12*b*, the display 12*b* is shown in FIG. 8C in parallel with the display 12*a* of FIG. 8B. Thus, FIG. 8C is a plan view of the display 12*b* from FIG. 8A, but such plan view is rotated 90 degrees in the direction of the arrows 8C-8C, e.g., about the axis 18. The top of the display 12*b* is identified 70*b* for convenient reference in FIGS. 8A and 8C for relational correspondence generally with the top 70*a* of the display 12*a* in FIGS. 8A and 8B. An image point 71*b* shown on the display 12*b* is provided on the top right of the display 12*b*. A virtual image view, i.e., the reflection from the beam splitter 14 will in effect make the point 71*b* appear somewhat superimposed or somewhat coincident but nevertheless somewhat shifted for stereoscopic imaging and viewing, relative to the image point 71*a* of the display 12*a*. Scanning of the image data or providing of the image data to the display 12*b* is in accordance with the direction of the arrows and lines 72*b*, 73*b* and 74*b*. It will be appreciated that such scanned direction or presenting of data is in effect inverted or opposite to the direction in which data is provided the display 12*a* (FIG. 8B). If the image data to the display 12*b* were not so inverted or reversed, the image point 71*b* would appear at location 76 in the display 12*b* (as is seen in FIGS. 8A and 8C) and, thus, would not coincide for a proper image presentation with a image point 71*a* of the display 12*a*.

As was described above, various techniques can be used to invert or to reverse the image data to obtain the desired stereoscopic image.

It will be appreciated that although the invention is described above with respect to flat panel display devices of the liquid crystal type, the invention may be used with other displays. However, if the displays do not have flat characteristics, the advantages of alignment, reflection minimization, and other features of flat panel display technology would not necessarily be available.

As was mentioned above, too, exemplary active matrix flat panel displays typically are rectangular and, for example, if relatively square, have the polarization axis of the output light at approximately 45 degrees to an edge of the display. This arrangement facilitates alignments of the various components hereof as was mentioned above. However, if desired, other polarization alignments may be employed and, if necessary, accounted for to enable discrimination between respective left and right images.

Although the beam splitter 14 is shown in FIGS. 1-3 as a prism type beam splitter device, it will be appreciated that other types of beam splitters may be used. An example is a glass plate, a sheet material that is semi-transparent and semi-reflective, or some other device that is able to transmit light from the respective displays for viewing by a viewer 11.

The images displayed by the display 12*a*, 12*b* may be presented to the viewer 11 simultaneously without the need for field sequential operation. Therefore, a high resolution image with minimal or substantially no perceptible flicker may be presented to the viewer and in such an embodiment, since all image data may be presented substantially simultaneously to and/or displayed by both displays, very high resolution is possible.

From the foregoing, then, it will be appreciated that the monitors 10, 20, 30 of the invention provide a display system useful to present stereoscopic or monoscopic images for viewing.

The images may be provided the displays 12*a*, 12*b* (sometimes referred to as display generators or as image generators) as stereo pairs. A stereo pair is a pair of images which, respectively, represent the left eye and right eye views of an image. The image data representing two images of the stereo pair may be provided to the frame buffer, for example, for temporary storage and delivery to the respective displays 12*a*, 12*b*. In some prior devices the left and right images are provided sequentially to a common display, and the sequential images are discriminated and provided for viewing to respective eyes of a viewer. In the present invention, though, the left and right images may be shown either sequentially, one on one display and one on the other display, or the left image may be shown on one display while the right image is shown on the other display. In prior display systems which use a common display to show sequentially left and right images, there may be a loss of some data that is displayed to the viewer, for example, due to various techniques employed to deliver data and to display images representing the data. The present invention allows all data for one image of a stereo pair to be presented the viewer and all data from the other image to be presented to the viewer, thus enhancing resolution, clarity, brightness, and other characteristics of the viewed image relative to the prior stereo display systems. The invention also increases the amount of information that can be provided/displayed to the viewer.

As is illustrated in several drawing figures the two display generators are arranged at right angles to each other. The angular relation may be other than right angle, as is described elsewhere herein. In the illustrated embodiments shown in the drawings those display generators are in vertical planes that are perpendicular to each other and intersect at the axis 18. However, if desired, one display generator or image generator may be in a vertical plane and the other in a horizontal plane, e.g., above or below the display generator which is in the vertical plane. In such case adjustment may be made to the arrangement of the beam splitter so both images can be viewed in substantially superposed relation but with appropriate offset in the respective images provided by the image data thereof to obtain stereoscopic views. Also, in such case it may be necessary to alter the manner in which the image data to one of the display generators is inverted relative to the image data provided the other display generator to obtain proper image superpositioning.

The arrangement of the display generators 12a, 12b is such that the two are perpendicular, and with the beam splitter cooperative therewith the images are provided along a common light path toward an output of the monitor(s) of the invention for viewing as described above.

Figure 9:
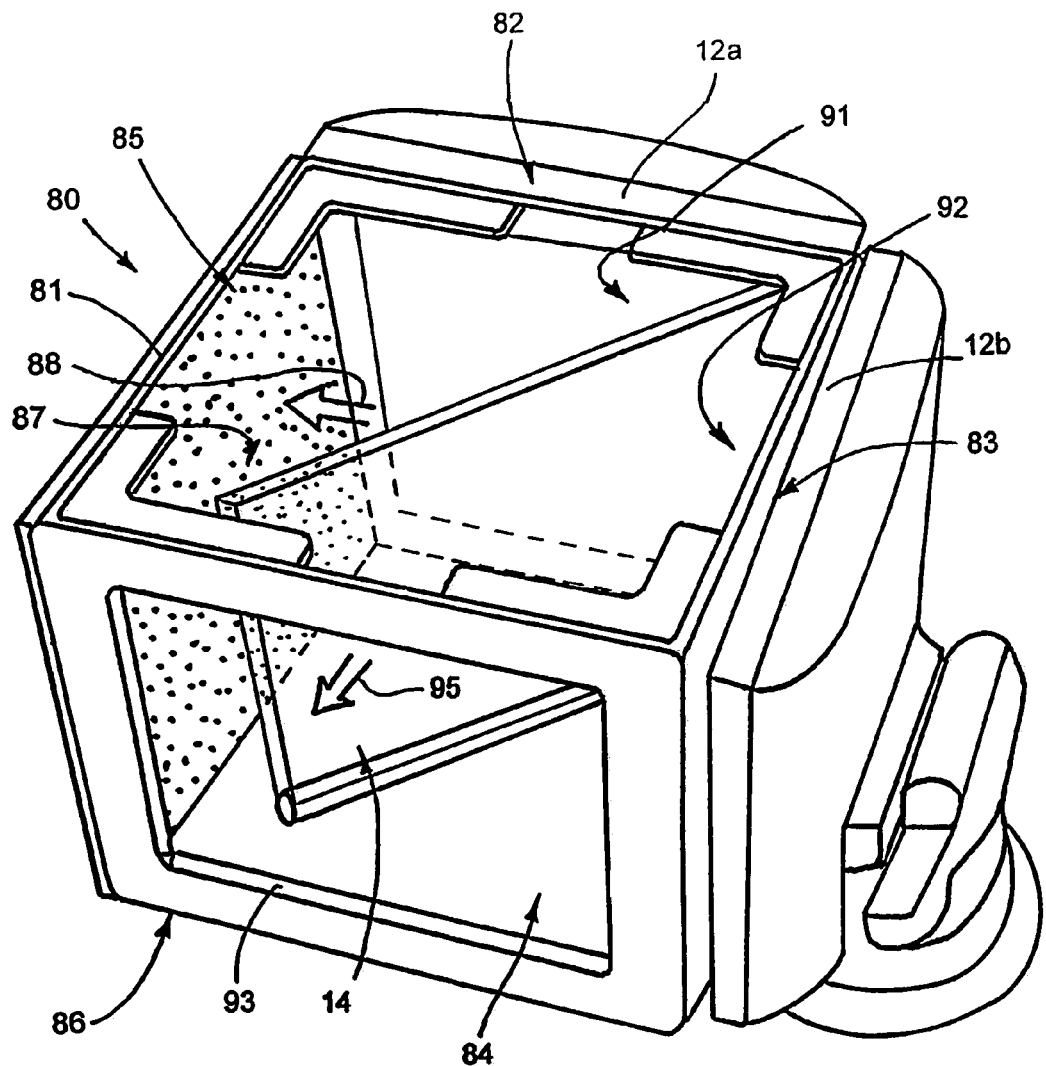
FIG. 9 is a schematic illustration of a display system according to an embodiment of the invention including two displays in a cubical mount.

Briefly referring to FIG. 9, an embodiment of display system 80 according to the invention is illustrated. The display system 80 includes a monitor, such as one of the monitors 10, 20, 30 described above. A cubical structure 81 having an open interior and at least three open sides 82, 83, 84 provides for alignment of and/or support of the displays 12a, 12b (associated polarizers (not shown)), and the beam splitter 14. In the display system 80 the top and bottom 85, 86 are open (or either or both may be closed, as desired) and the side 87 includes a light absorbing material to absorb light 88 from the displays which is not intended for viewing. Such absorbed light is that provided by the display 12a and reflected by the beam splitter and that provided by the display 12b and transmitted by the beam splitter. Therefore, such light tends not to interfere with the viewed image received by the viewer 11 (FIG. 1). The cubical structure 81 may be a plastic, metal or other material. It may include a number of arms, frame members, etc., which are coupled together in relation to each other to obtain the form illustrated. The displays 12a, 12b may be positioned relative to the structure 81 or may be positioned in windowed openings 91, 92 in the respective open sides 82, 83. The windowed opening 93 in the front side 84 allows viewing of the beam splitter and light from the displays 12a, 12b, which is combined by the beam splitter to be provided as output light along a common light path 95 which may be viewed by the viewer to obtain a desired stereoscopic image.

Figure 10:
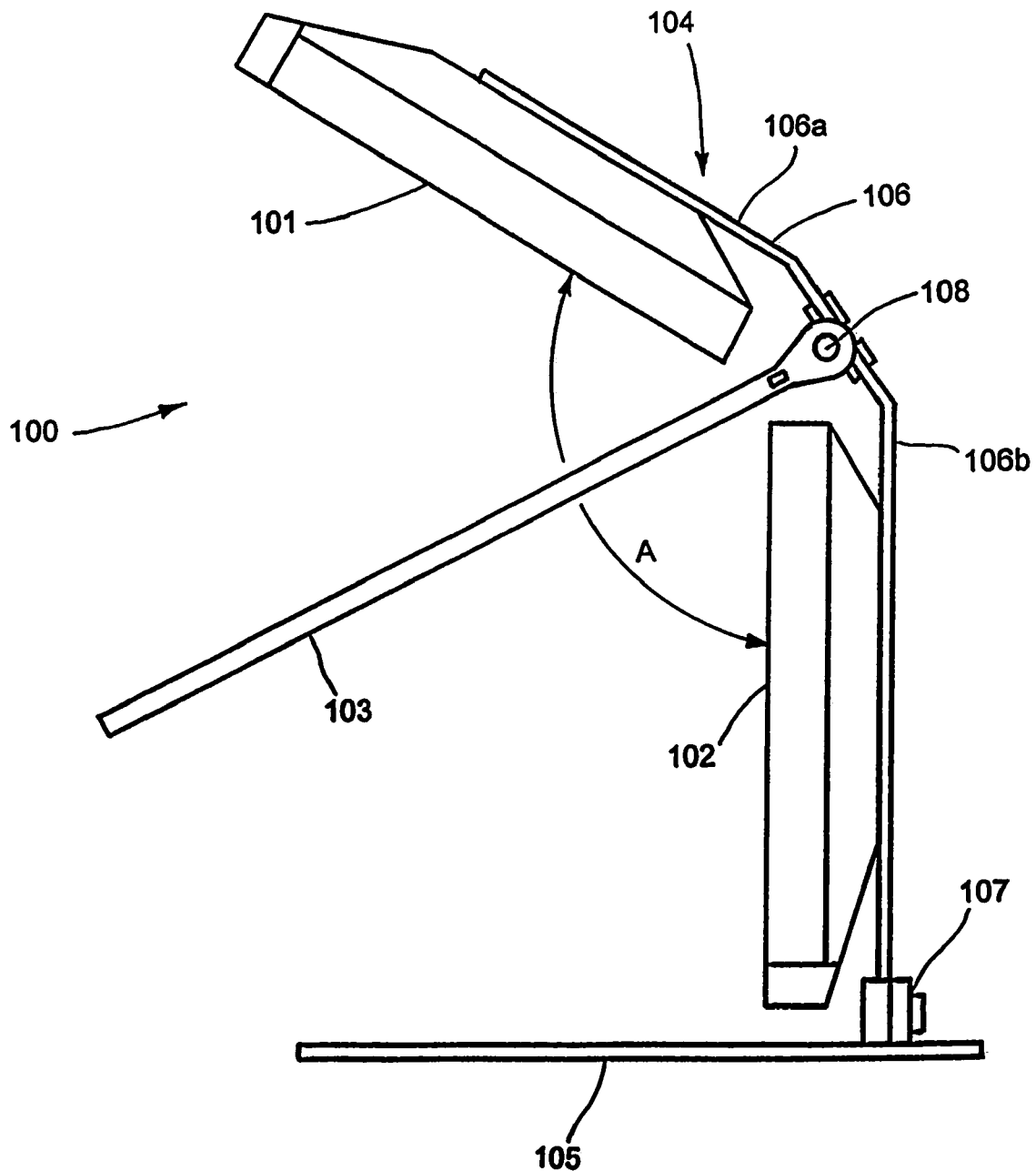
FIGS. 10-15 are, respectively, side, front, isometric, back, top and bottom views of an over/under monitor arrangement.
Figure 11:
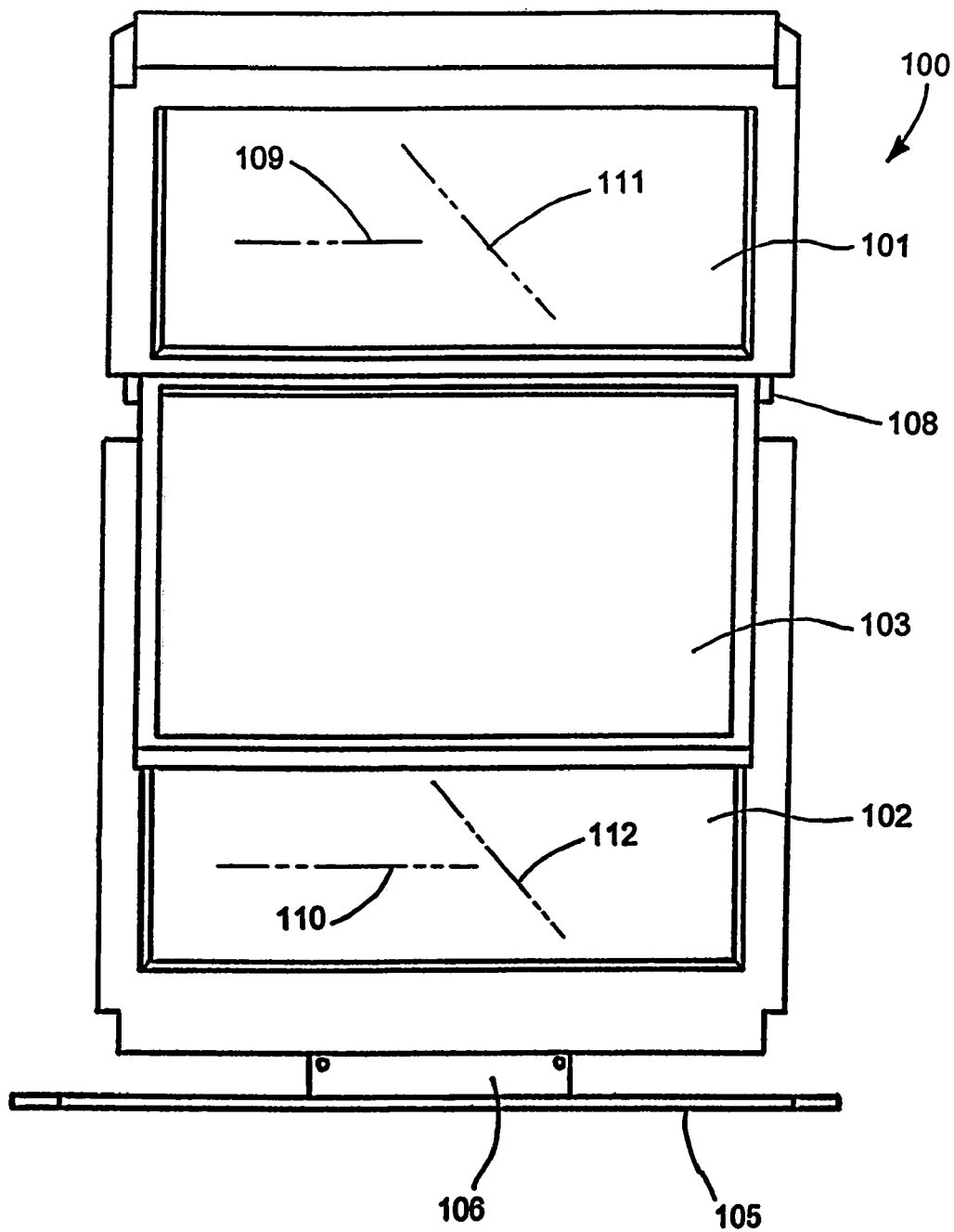
Figure 12:
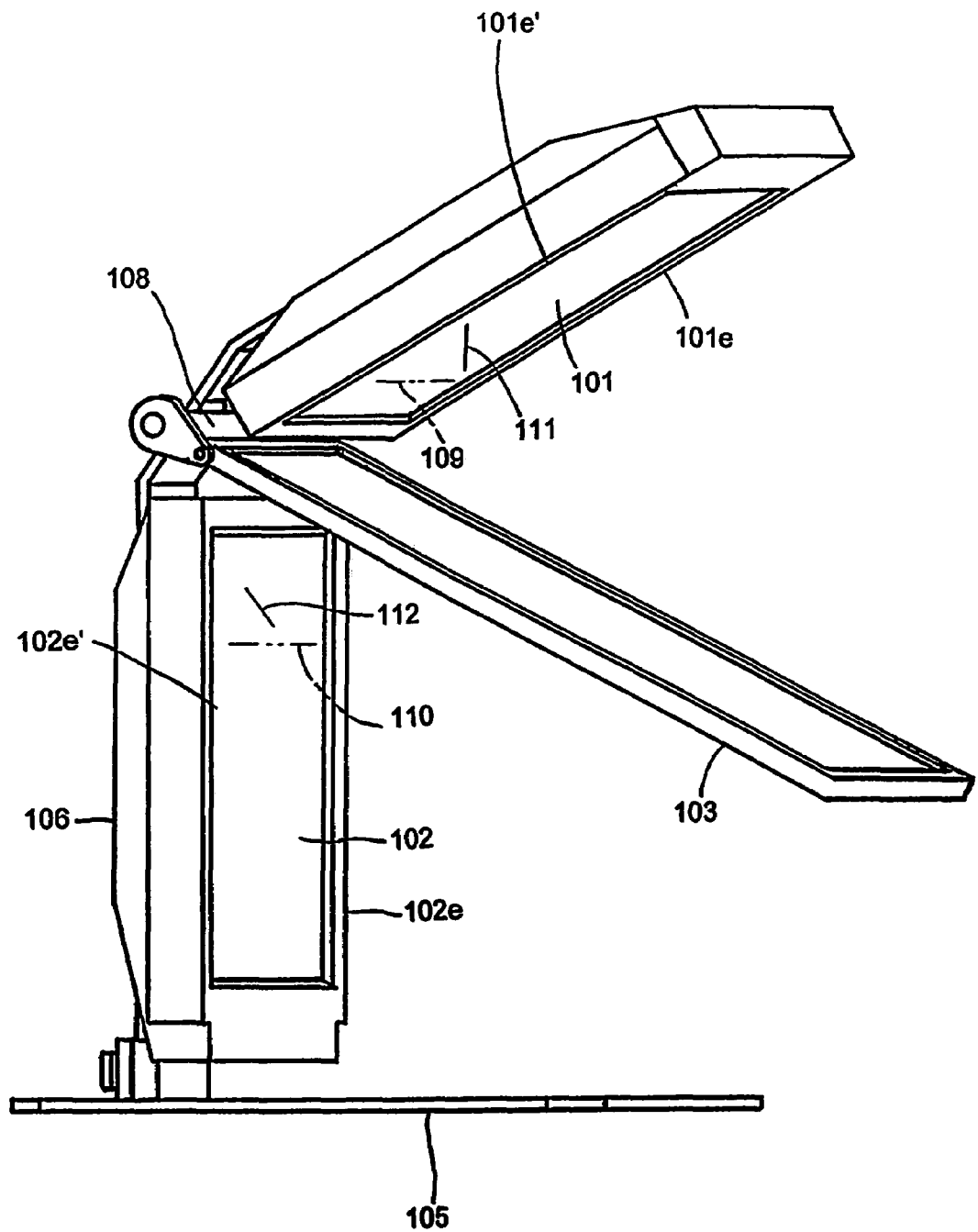
Figure 13:
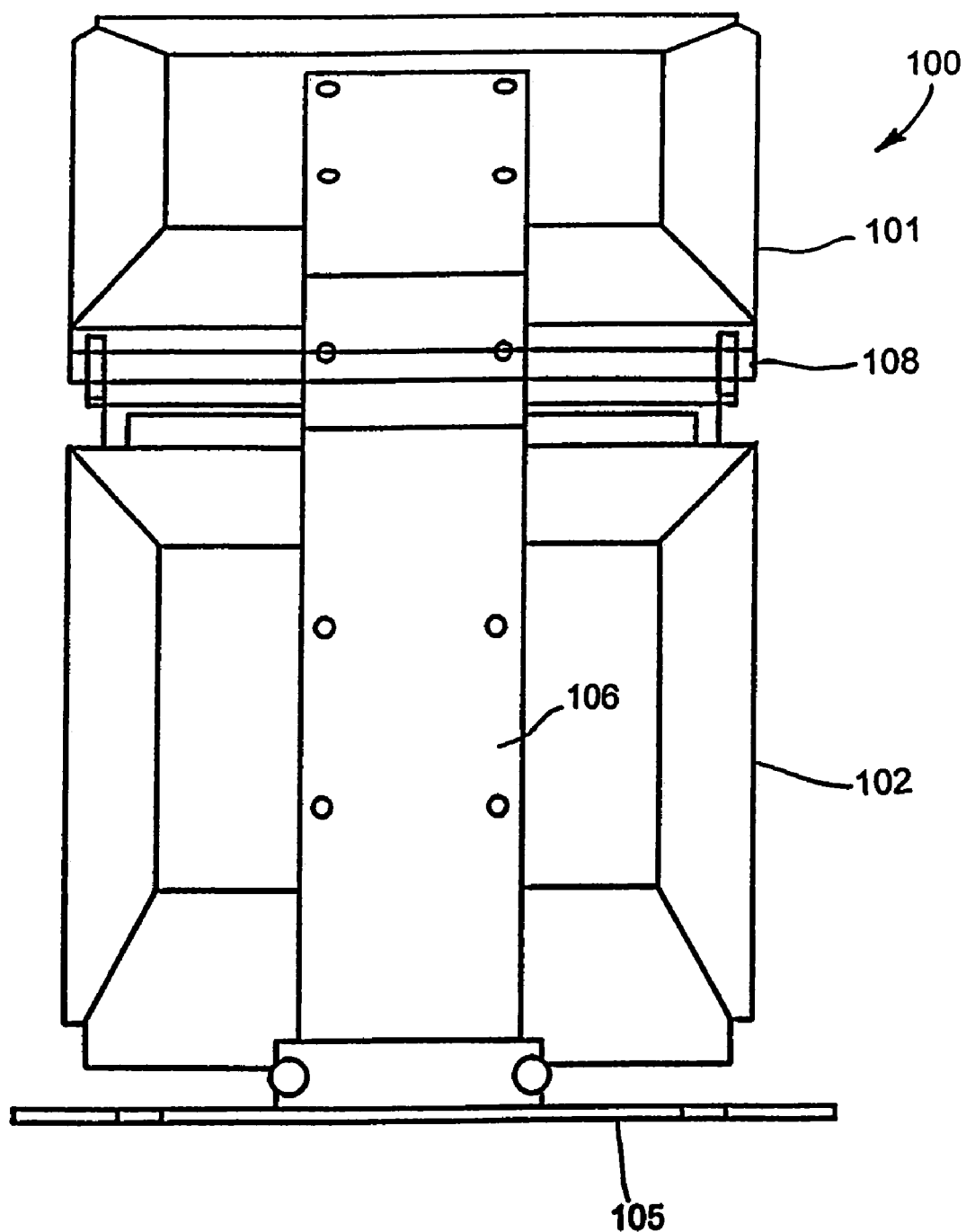
Figure 14:
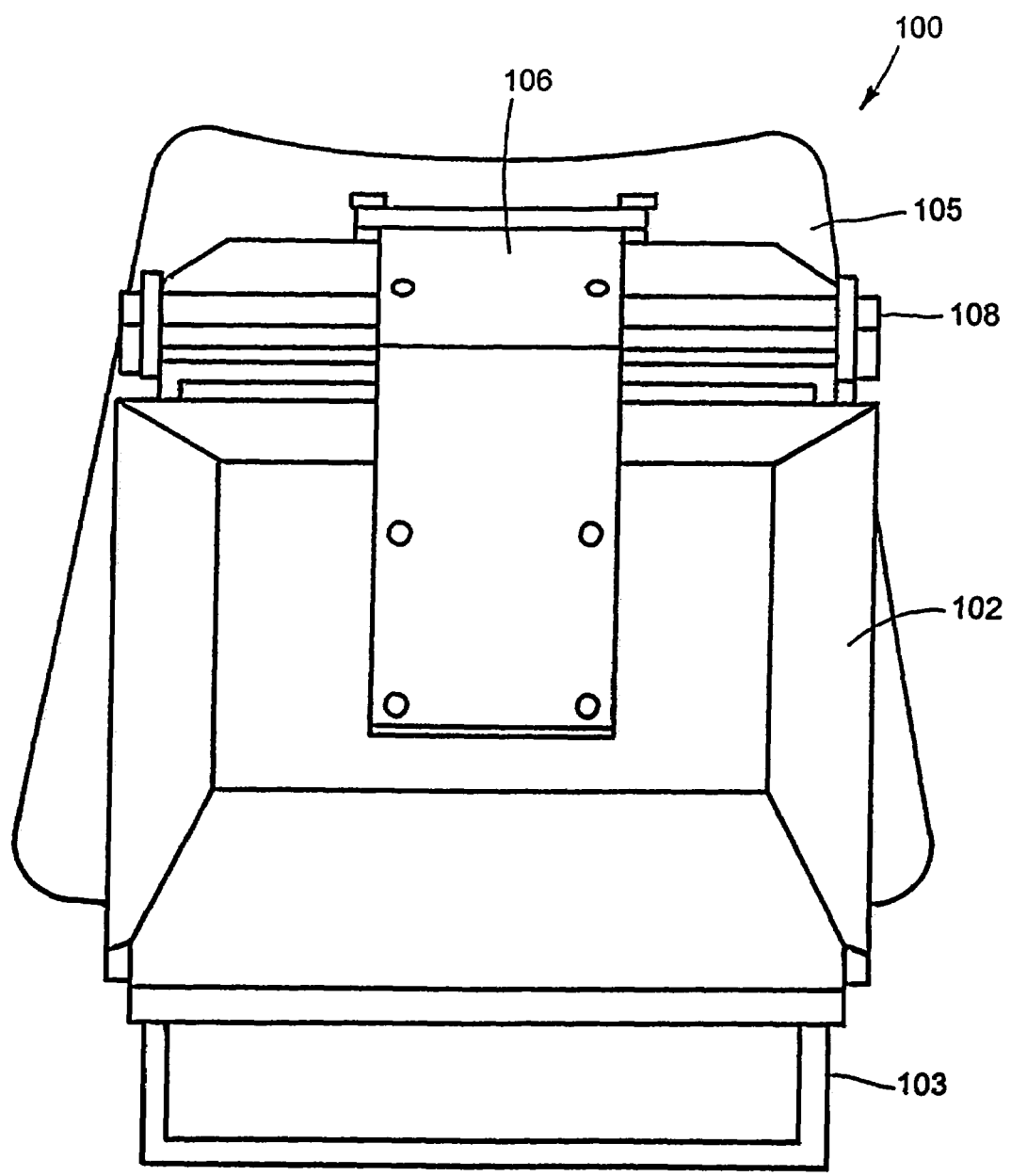
Figure 15:
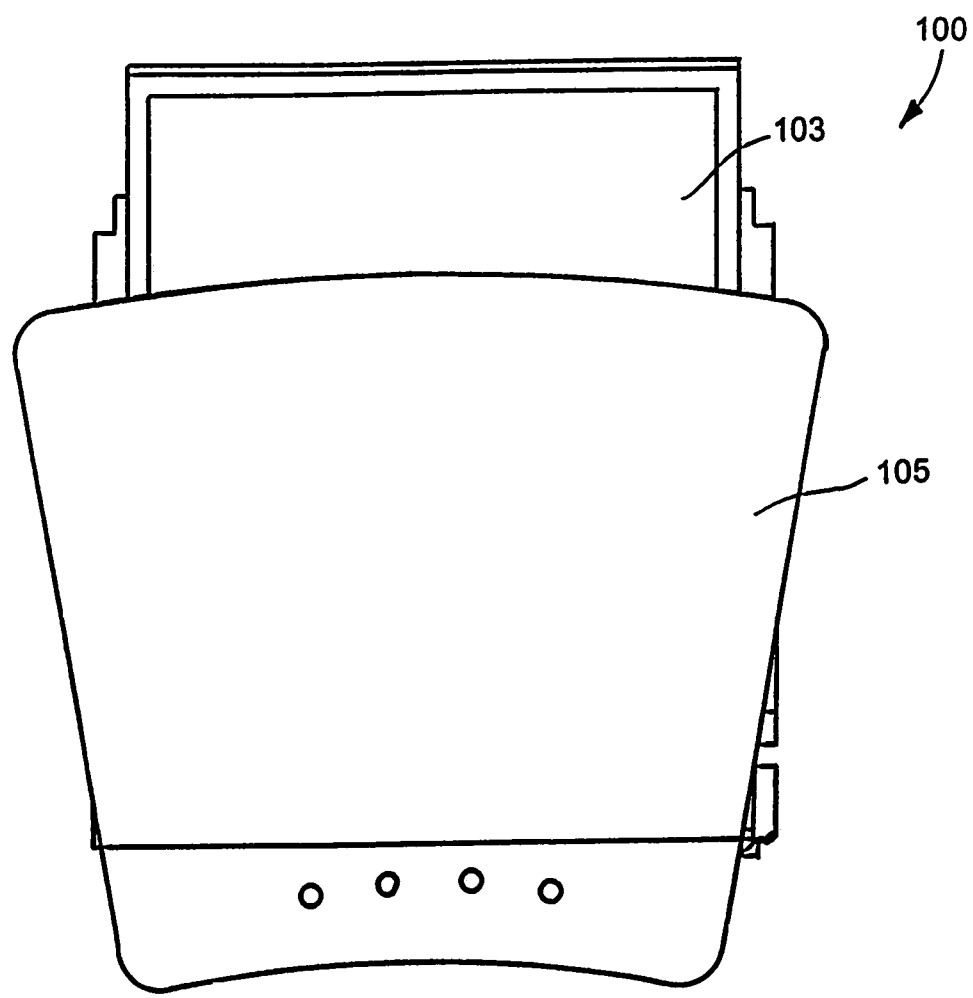

Referring to FIGS. 10-15, an embodiment of monitor 100 that embodies the various features of the invention described above is illustrated. The monitor 100 includes a pair of displays 101, 102 that are oriented at an angle relative to each other generally in a manner described above, and a beam splitter 103 at the bisectrix of the angle. In FIG. 10 the angle is represented by the letter A. The angle A is an obtuse angle as it is illustrated in FIG. 10. The obtuse angle may be greater than 90 degrees up to 180 degrees. In several examples, the obtuse angle may be from greater than 90° to approximately 170 degrees. In another example the obtuse angle may be from about 100 degrees to about 150 degrees. In another example the obtuse angle may be on the order of approximately 110 degrees to 140 degrees. The obtuse angle may be on the order of approximately 120 degrees.

In FIG. 10 a mount 104 is illustrated for mounting and supporting displays 101, 102 and the beam splitter 103 in relation to each other. An exemplary mount includes a base 105 and a mounting bar or strap 106. The base and strap have adequate strength, stiffness and other appropriate mechanical characteristics to hold the displays and beam splitter in relation to each other at, for example, the illustrated obtuse angle A relation, at a 90 degrees relation, such as that described with respect to a number of the embodiments above, etc. The strap 106 may be attached to the base 105 by a fitting 107.

In FIG. 10 a hinge 108 is illustrated schematically. The hinge 108 may provide support for the beam splitter 103 from the strap 106. The hinge 108 also may be a point about which one portion 106a of the strap 106 may be pivoted relative to the other portion 106b of the strap 106.

The displays 101, 102 illustrated in FIG. 10, for example, and the displays described above, may be flat panel displays, liquid crystal displays, etc. The displays themselves or in conjunction with polarizers or the like provide polarized light outputs as was described above.

The two displays 101, 102, or other pairs of displays used in the several embodiments hereof, may have the following characteristics. For example, they may have the same aspect ratio and the same resolution. Resolution may be, for example, considered in pixels or dots per inch, examples being 72 dots per inch, 188 dots per inch, 288 dots per inch, etc. Thus, the displays 101, 102 may have the same spatial resolution or digital resolution. The physical size of the two displays 101, 102 may be the same or they may be different from each other. The polarization characteristics of the displays 101, 102 are the same, as was described above. Thus, as an example, with reference to FIG. 12 where the faces of both displays 101, 102 can be seen, each display has a pair of opposite edges, for example, 101e, 101e' and 102e, 102e'. Consider a direction parallel to the hinge 108 extending across the face of each display 101, 102 from the respective edges 101e, 101e' and 102e, 102e', as is represented by lines 109, 110 in FIG. 12. The direction of polarization of plane polarized light from the respective displays 101, 102 is at a 45 degrees angle to the respective lines 109, 110, as is schematically represented at lines 111, 112 in FIG. 12. Therefore as was described above, a person viewing the display 102 through the beam splitter 103 will see an image from the display 102 formed by light having a linear polarization in the direction of the line 112. The viewer would see the image from the display 101 as light reflected from the beam splitter 103, and the direction of polarization of linear polarized light of such image is crossed, i.e., is rotated to be at 90 degrees relative to the direction of polarization represented by line 112 of the image provided by the display 102. Thus, operation of the monitor 100 is like the operation of the monitors described above in accordance with the invention. Due to the relationship of polarization directions and the relative positioning of the beam splitter to the displays, e.g., at the bisectrix of the angle between the two displays, polarization direction of reflected light is rotated by the beam splitter, as was described above. Also, circular polarized light may be used in the manner described above.

The beam splitter 103 may include an anti-reflecting coating (sometimes referred to as anti-reflective coating) on the surface thereof opposite the surface that effects the light reflecting function of the beam splitter. Various anti-reflecting coatings and processes are available. Also, various techniques are known to provide for light reflection from a desired surface of a beam splitter, for example, a beam splitter in the form of a sheet-like material such as that illustrated in FIGS. 10-15. The beam splitter 103 also may be of the non-polarizing type in that it does not affect polarization of light; such beam splitters sometimes are referred to as polarization neutral beam splitters. The beam splitter 103, for example, may change the direction of light propagation by reflecting the light, but it does not affect polarization. The beam splitter does function to rotate the plane of polarization or to change the sense of circular polarized light in the manner described above, though. Thus, it will be appreciated that the beam splitter 103, as well as the beam splitters described elsewhere herein in connection with the other illustrations of the invention, may be considered an engine or the device or operative instrument that effects the rotating of the plane of polarization of the reflected light while transmitting without affecting the plane of polarization the transmitted light from the respective displays so that light from the respective displays can travel along a common light path to be viewed by a person who is using polarized lenses (reference to "lenses" includes actual lenses, and also includes polarizers, analyzers, eye glasses containing same, etc.) to separate the two images based on respective polarization characteristics. Such operation by the beam splitter 103 is effected without regard to whether the light is plane polarized or circular polarized, as was described above.

In the illustrations of the monitor 100 of FIGS. 10-15, it will be appreciated that the arrangement of the displays 101, 102 and the beam splitter 103 is an over and under type of arrangement rather than a side-by-side arrangement illustrated in FIG. 9, for example and in other figures described above. As an example, over and under is indicative of one display being vertically above the other, but otherwise arranged generally in the manner described above. The various features of the invention described in the several embodiments, whether the displays are side-by-side, over and under, or in some other arrangement, are useful in the several embodiments. It also will be appreciated that other arrangements of the displays may be provided, such as, for example, a generally vertically oriented display and one that is beneath it, e.g., opposite the arrangement shown in FIGS. 10-15, or in some other arrangement.

Figure 16:
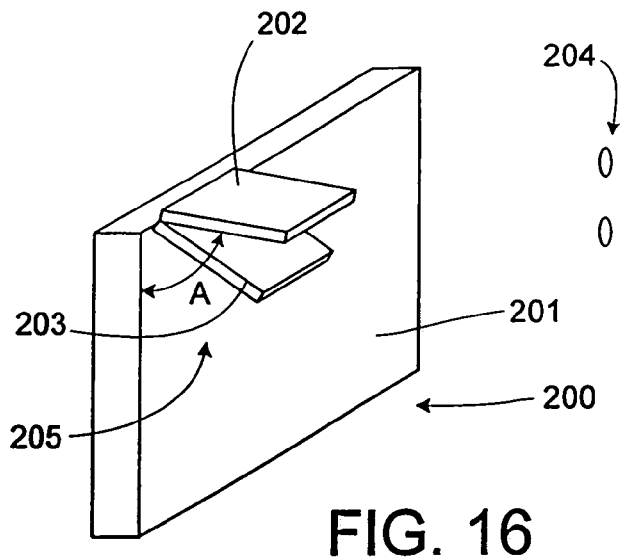
FIG. 16 is a fragmentary isometric view of a windowed 3D monitor.

Briefly referring to FIG. 16, as was mentioned above, in the monitor 200 the physical size or display area of displays 201, 202 (or other pairs of displays described above) are different. The arrangement of the displays and the beam splitter in such case, though, still would embody the arrangements described above with respect to the displays being at an angle relative to each other, the beam splitter at the bisectrix of the angle and the displays being viewable so that a viewer can see one display through the beam splitter and see the other display be reflection from the beam splitter. The polarization characteristics would be as described above. With the displays being of different physical sizes, though, a window effect (sometimes referred to as "windowed") may be achieved whereby, for example, a stereo image is seen in a small portion of the overall viewed area by a person viewing such a display. In the illustrated example of such an embodiment in FIG. 17 a relatively large display 201 and a relatively smaller display 202 are illustrated at an angle of approximately 9 degrees or greater, for example, an obtuse angle, relative to each other. A beam splitter 203 is positioned at the bisectrix of an angle A. Thus, an observer having polarized glasses shown at 204 may look at the images from the monitor 200 of FIG. 17 and see a large image on the display 201 or one or more images on the display 201 and also may see a stereo image formed in the area 205 by the two displays 201, 202 and beam splitter 203, whereby the area 205 may appear as a window.

Figure 17:
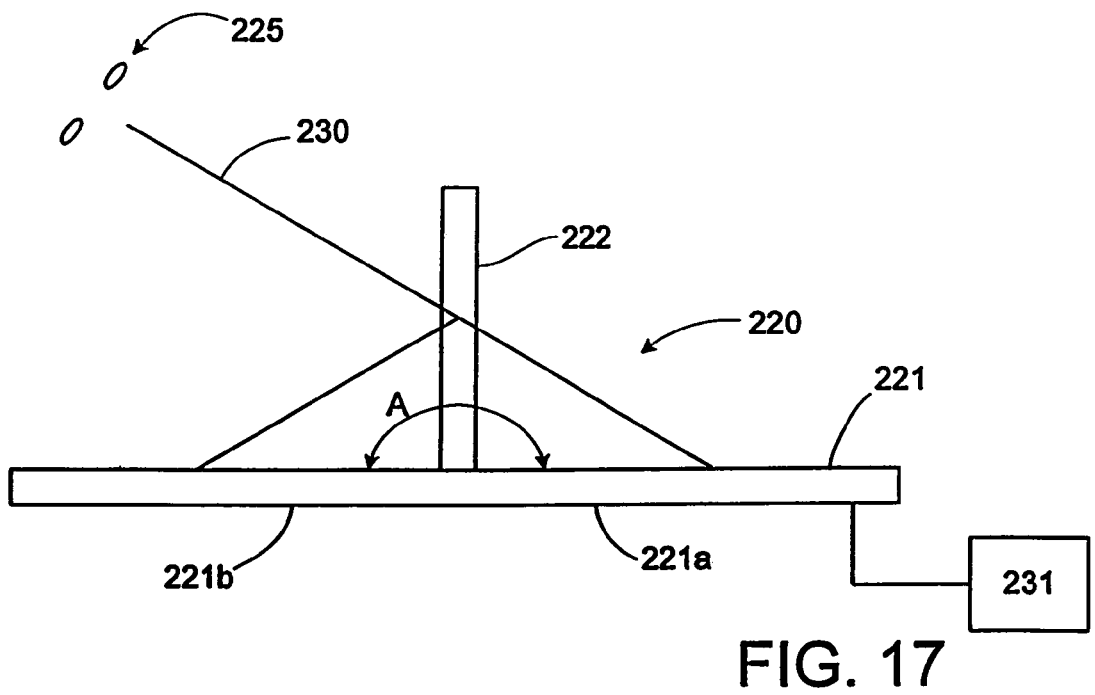
FIGS. 17 and 18 are schematic side elevation view and top plan view of another monitor using one display or two displays at a 180 degree angular relation.
Figure 18:
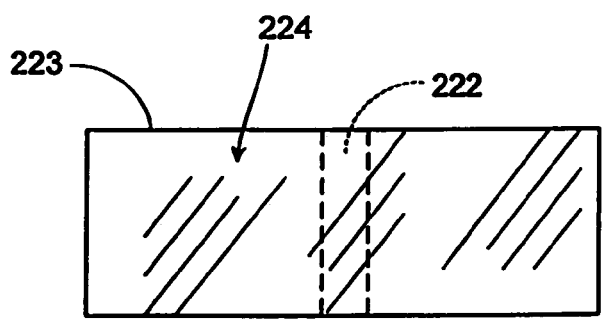

Turning to FIGS. 17 and 18, a monitor 220 is illustrated. The monitor 220 includes a display 221 and a beam splitter 222. The display 221 is analogous to the arrangement of displays 40 shown in FIG. 6 whereby two displays are oriented in parallel, e.g., whereby the angle between them is 180 degrees. In FIGS. 17 and 18 the display 221 is a single display (or it may be two displays as in FIG. 6), and the direction or plane of polarization is at 45 degrees to an edge, such as an edge 223, the polarization being represented by the lines 224, for example. The polarization direction is referenced to the edge 223 for convenience of description. However, it will be appreciated that such configuration presumes that the beam splitter is oriented as shown. The relation of the polarization direction actually is determined relative to the beam splitter or to the actual or imaginary axis mentioned above to obtain rotation of polarization direction of light by reflection from the beam splitter. Thus, the display 221 is analogous to a display having two parts 221a, 222b that are at an obtuse angle A, which is 180 degrees. The beam splitter 222 is at the bisectrix of the obtuse angle A.

A person may view the monitor 220 via a pair of polarized lenses 225 such that the lenses are polarized at 90 degrees to allow light from a left eye image to reach the left eye and light from a right eye image to reach the right eye. Alternatively, the polarized lenses 225 may be circularly polarized, and the light reaching the lenses would be circularly polarized for discriminating between left and right eye images of a stereo pair provided by the monitor 220, generally as was described above.

Light from the display portion 221a can be seen by looking through the beam splitter 222. Light from the display portion 221b may be viewed by reflection from the beam splitter. When the light reflects from the beam splitter 222, the direction of polarization is rotated 90 degrees. Therefore, images from the respective display portions 221a, 221b may be viewed along a common light path 230, and the images may be separated by optical polarization characteristics using the polarizers 225. If the light is linear polarized, then the polarized lenses 225 would be linear polarized and crossed by 90 degrees; if circular polarized light is used then the polarizers 225 would be circular polarizers having opposite sense, as was described above.

Thus, the monitor 220 provides an easy approach to obtaining a 3-D image using a single display. Driving circuitry 231 may be associated with the display 221 so that the image provided at respective display portions 221a, 221b are a stereo pair.

A Display System Using Optical Retarders and in which Polarization is NOT being Affected by Reflection.

An aspect of the invention relates to an apparatus and method for displaying and viewing stereo images, wherein two displays (sometimes referred to as image generators or the like) provide respective stereo pairs that are plane polarized in the same direction and are directed along respective light paths toward a beam splitter. An optical retarder, for example, a half wave plate or other retarder arrangement or device for changing direction of the plane of polarization, in one of the respective light paths rotates the direction of the plane of polarization of light in that one light path by ninety degrees (90°). The beam splitter combines the images by reflection and transmission and provides the combined images to a common light path without changing the direction of the plane of polarization of the plane polarized light that is incident thereon. Some of the light that is incident on the retarder and is not at the optimum wavelength (or at least near the optimum wavelength) for the retarder undergoes dispersion, whereby some of that light may become elliptically polarized. Thus, optically downstream of the beam splitter the light in the common light path includes both stereo pair images that, respectively, are plane polarized in orthogonal directions and also may include elliptically polarized light due to dispersion caused at the mentioned retarder.

The stereo pair images can be discriminated, e.g., separated, based on optical polarization. For example, a viewing device having a pair of plane polarizers (sometimes referred to as viewing polarizers or analyzers) may be in position to receive light in the common light path. The direction of the plane of polarization (polarization direction) of the viewing polarizers is the same, e.g., to transmit plane polarized light that was rotated by the mentioned retarder. That one viewing polarizer also may transmit those components of the mentioned elliptically polarized light that sufficiently resolves in the direction of polarization of that one viewing polarizer as to be transmitted. Plane polarized light in the other of the respective light paths to the beam splitter that does not include the retarder would be blocked by such one viewing polarizer.

A further optical retarder is in the light path to the other of the viewing polarizers. The further retarder is oriented in a direction that is relatively opposite to the orientation of the first optical retarder (first mentioned retarder or first retarder) that is in the light path from one of the displays to the beam splitter. The retardation and other optical characteristics of the further retarder are the same or substantially the same as those of the first retarder. Therefore, the further retarder affects the received light that was affected by the first retarder that represents one image of a stereo pair, both to rotate the direction of the plane of polarization by 90° (in effect to the original direction optically upstream of the first retarder) and to reverse or to eliminate the effects of dispersion by the first retarder, whereby the mentioned elliptically polarized light becomes plane polarized in the same direction as the original direction of plane polarized light optically upstream of the first retarder.

As for the plane polarized light that is received in the common light path from the other of the respective light paths to the beam splitter, i.e., that light which was not affected by the first retarder, the further retarder rotates the direction of the plane of polarization by 90°, and for some of that light that is incident on the further retarder and is not at the optimum wavelength for the retarder, the further retarder may cause dispersion, whereby some of the light may become elliptically polarized. The other viewing polarizer has a polarization orientation to transmit polarized light from the other of the respective light paths to the beam splitter, e.g., including that light which was rotated by 90° by the further retarder and those components of elliptically polarized light that sufficiently resolve in the direction of polarization of that other viewing polarizer so as to be transmitted thereby.

It will be appreciated that the direction of plane of polarization for the plane polarized light images directed along first and second respective optical paths (sometimes referred to as respective channels) to the beam splitter may start out the same. The first retarder in the first light path rotates the plane of polarization and may cause dispersion of light in the first light path. The beam splitter directs the images from both the first and second light paths (channels) to a common light path. In a sense, since the two images are in the same light path, they may be referred to as being multiplexed; and the multiplexed images can be discriminated or separated based on optical polarization characteristics.

The images in the common light path can be separated and simultaneously viewed via respective viewing polarizers, e.g., first and second plane polarizers, which may be positioned to view, respectively, images that were provided by the displays in the first and second optical paths. The further retarder in the light path to the second viewing polarizer removes the effect of dispersion caused by the first retarder so light in the first light path that includes the first retarder and had encountered dispersion will not transmit through the second viewing polarizer. Therefore, the further retarder in effect nulls the dispersion caused by the first retarder and allows the elliptically polarized light (dispersion light) to be nulled or blocked by the second viewing polarizer. Some of the elliptically polarized light due to dispersion at the first retarder may be transmitted by the first viewing polarizer, but this is acceptable because such elliptically polarized light is that which is of the same image that is to be transmitted by such first viewing polarizer. The amount of such transmitted dispersion light may be appreciably less than the plane polarized light that is intended to be transmitted by the respective viewing polarizer, but whether it is larger than that would not affect the viewed image because it represents the correct image to be viewed via that viewing polarizer. The same would be true for dispersion light that is transmitted through the further retarder and the viewing polarizer associated therewith as is described in further detail herein.

From the foregoing it will be appreciated that absent other optical components in one or more of the optical paths, e.g. components that effect rotation, conversion to circular or elliptical polarization, etc., the direction of the plane of polarization of the viewing polarizers may be the same. Also, if desired, the viewing polarizers may be one plane polarizer with respective portions for positioning before respective eyes of a viewer and the further optical retarder is positioned optically upstream of that portion of the viewing polarizer that is intended to be looked through by a respective viewer's eye to see a respective intended image, as is described in further detail below.

Optical dispersion may occur in optical retarders if the retardation is not carried out at zero order, as is known and as is mentioned in several of the above-referenced patents. Retardation at zero order, e.g., without dispersion, usually only is possible for a given optimum wavelength of light (or within a reasonable range of wavelengths near the optimum wavelength) of light for a given optical retarder. In the present invention the use of two optical retarders tends to cancel the effects of dispersion and provides for operation to provide optical retardation as though it were carried out at zero order not only for the optimum wavelength of the retarder but also for other wavelengths of light.

FIGS. 19 and 20 illustrate a display system or monitor 310 for showing three-dimensional (3D, also known as stereo or stereoscopic) images, wherein polarization is not affected by the beam splitter. The display system 310 includes a pair of displays 312a, 312b to provide, for example, respective left eye and right eye images of a stereo pair of images, a beam splitter 314, a viewing device 316, and pair of half wave plates 318a, 318b. The display system 310 and viewing device 316 may be referred to collectively herein as a viewing system 300; sometimes the display system 310 is described as including the viewing device 316.

The displays 312a, 312b, respectively, provide left eye and right eye images formed by plane polarized light. Reference to plane polarization, linear polarization, linearly polarized, are intended to be equivalent. The displays and beam splitter are so positioned that the displays are at an angle A to each other, the planes of the displays intersect and are parallel to a common linear axis 18 (e.g., are congruent with the linear axis), and the beam splitter also is congruent with the linear axis 18 and is positioned along the bisectrix of the angle A. The angle A may be an obtuse angle, a ninety degree (90°) angle, or an acute angle. The viewing device 316 includes a pair of plane polarizers 316a, 316b that are oriented to have a polarization direction perpendicular to the plane of polarization of the displays. Reference to plane of polarization, direction of polarization, etc., are intended to be equivalent.

The plane of polarization for both displays 312a, 312b is the same and either is parallel to or perpendicular to the linear axis 18. Therefore, as the beam splitter 314 reflects light from one of the displays toward a viewing area 320 and transmits light from the other display toward the viewing area, the beam splitter does not change the direction of the plane of polarization of the light. Incident light along respective light paths or optical paths (or channels) 321a, 321b from the displays 312a, 312b to the beam splitter 314 is in a sense combined by the beam splitter and is directed in a common light path or optical path 321c toward the viewing area 320.

The viewing device 316 may be placed near the eyes of a viewer, e.g., a person. The viewer would view images from the displays 312a, 312b such that the left and right eyes, respectively, would view the respective left eye and right eye images, thereby to perceive a stereo image, e.g., as was described above.

The half wave plates 318a, 318b are positioned to rotate the plane of polarization of plane polarized light incident thereon by ninety degrees (90°). For example, the slow axis of each half wave plate is at forty-five degrees (45°) to the plane of polarization of the light incident thereon in the manner described just below. The first half wave plate, e.g., 318a, is in the light path between one of the displays and the beam splitter 314, for example, between the display 312a that provides the left eye image, and the beam splitter 314. The other half wave plate, e.g., 318b, is in proximity to the polarizer 316b, which is intended to transmit the right eye image for viewing.

The first half wave plate 318a is oriented to rotate the plane of polarization of light from the display 312a by 90 degrees; thus, for example, the slow axis of the half wave plate 318a is oriented at forty-five degrees (45°) to the plane of polarization of light from the display 312a—for the sake of facilitating this description such direction will be referred to as positive forty-five degrees (+45°). Since the half wave plate 318a rotates the plane of polarization of light from the display 312a by 90 degrees, such light will transmit through the polarizer 316a for viewing.

The further half wave plate 318b proximate the polarizer 316b in the viewing device 316 is oriented relative to the plane of polarization of the light from the display 312b that provides the right eye images such that the slow axis is at a negative forty-five degrees (−45°), this in contrast to the opposite orientation direction of the half wave plate 318a to the plane of polarization of light from the displays 312a, 312b. The half wave plate 318b rotates the plane of polarization of the light from the display 312b by ninety degrees (90°) (or in a sense negative ninety degrees (−90°)). Therefore, light from the display 312b will transmit through the polarizer 316b for viewing. However, plane polarized light from the left eye display 312a that was rotated ninety degrees (90°) by the half wave plate 318a, again will be rotated ninety degrees (90°) by the half wave plate 318b and will be blocked by the polarizer 316b.

Thus, in the example described it will be appreciated that plane polarized light in the left eye channel 321a from the display 312a may be viewed only by the left eye 322a of a viewer, and the plane polarized light in the right eye channel 321b from the display 312b may be viewed only by the right eye 322b of a viewer. For example, light in the left eye channel that is rotated ninety degrees (90°) by the half wave plate 318a may be provided via the beam splitter 314 and the polarizer 316a to the left eye for viewing. Meanwhile, the plane of polarization of light from the right eye display 312b and beam splitter 314 is not rotated prior to impinging on the polarizer 316a; and, therefore, the polarizer 316a will block such light from the left eye. Also meanwhile, light is provided via the beam splitter 314 to the viewing device 316 where the half wave plate 318b is located in the optical path to the polarizer 316b; and the half wave plate 318b will rotate the plane of polarization of the light from the right eye display 312b so that light is provided via the polarizer 316b to the right eye for viewing, while the half wave plate 318b rotates the plane of polarization of light from the left eye display 312a so that light is blocked from transmission to the right eye by the polarizer 316b.

Optical dispersion may occur as plane polarized light is transmitted through a half wave plate that is oriented to rotate the plane of polarization by ninety degrees (90°), as there usually is an optimum wavelength for which the half wave plate would rotate the plane of polarization by ninety degrees (90°). Other wavelengths would tend to have some elliptical polarization characteristics after being transmitted through the half wave plate. However, since the half wave plates 318a, 318b are functional to rotate plane polarized light in different light paths, respectively, e.g., the different respective left eye and right eye optical channels, and since the half wave plates are oriented in opposite directions, e.g., with the slow axis of each, respectively, at plus and minus forty-five degrees (45°) to the plane of polarization of the light from the respective displays 312a, 312b, dispersion and its effects caused by the half wave plate 318a would be canceled or nulled by the half wave plate 318b. Therefore, the light representing the left eye image that is provided via the half wave plate 318a and beam splitter, including plane polarized light that is at the optimum wavelength for the half wave plates together with dispersed light wavelengths will be reconstituted by the half wave plate 318b as plane polarized light that has a plane of polarization perpendicular to the transmissive direction of the polarizer 316b—and such light will be blocked by the polarizer 316b. However, the optimum wavelength light and at least some of the elliptically polarized light from the half wave plate 318a and the beam splitter that represents the left eye image will transmit through the polarizer 316a for viewing.

The half wave plates 318a, 318b may be optical retarders or other devices that provide the functions described herein. Also, although the retarder 318a is shown in the transmitted light path 321a that is transmitted by the beam splitter 314, it may be in the reflected light path 321b. The retarders 318a, 318b should be in respectively opposite image channels, as is evident from the description hereof.

As was described above, the direction of the plane of polarization for both polarizers 316a, 316b in the viewing device 316 is the same. This may improve angle of view uniformity for both left and right viewing channels of the display system 310 and also may reduce color disparity in respective left and right viewing channels. Some optical polarizers may have different angle of view characteristics and/or may have different color effects as the angle at which the display is viewed is changed in a direction parallel or perpendicular to the plane of polarization. If the polarizers 316a, 316b were oriented such that the respective planes of polarization were perpendicular to each other, then as the viewing angle changes, uniformity and color may change differently for the images as viewed by a viewer.

The displays 312a, 312b and the beam splitter 314 may be of the types described above. For example, the displays may be liquid crystal displays that provide images by light that is plane polarized. If desired, the displays may be other than liquid crystal displays, and polarizers (or some other means), e.g., as are shown at 330, 332 in FIG. 19, may be used to provide the plane polarized light characteristic to the respective images. Other types of displays and/or additional devices or the like may be used to obtain the images with the plane polarized light characteristic. The displays may be relatively high resolution displays; they may have the same resolution, be of the same or different size, and have the same direction of plane of polarization or are adjusted to have polarization directions to provide for the functions described herein. One image from one of the displays would be inverted as was described above with respect to the embodiments of FIGS. 1-18.

The displays 312a, 312b may be relatively wide angle of view type displays. The displays may have the same angle of view characteristics and may be arranged such that the polarization directions (directions of plane of polarized light therefrom or from a polarizer associated therewith) are the same. Using an optical retarder in one of the light paths from a display to the beam splitter as is described below, for example, the plane of polarization of light from one display may be rotated by ninety degrees so that the light from the two displays incident on the beam splitter has crossed polarization. In an embodiment exemplary displays may be twisted nematic liquid crystal displays; the displays may be other types, if desired.

The beam splitter 314 does not change the polarization characteristic of the polarized light incident thereon and either transmitted or reflected thereby both due to the non-polarizing character of the beam splitter and because the plane of polarization (sometimes referred to as the direction of polarization) of such incident light is parallel to or perpendicular to the mentioned linear axis. Without having a specific nomenclature for describing the polarization direction of the light incident on the beam splitter, one might refer such polarized light being square to the surface of the beam splitter rather than being at an angle to the surface of the beam splitter—in contrast an angular relation is described above with reference to earlier described embodiments herein to obtain rotation of the plane of polarization of the reflected plane polarized light.

The display system 310 also includes a viewing device 316 to view the images from the displays 312a, 312b. The viewing device may be, for example, a pair of plane polarizers 316a, 316b; the plane polarizers may be mounted or held in a frame, e.g., as an eyeglass frame or the like, as is described above.

With the displays 312a, 312b displaying respective left eye and right eye images of a stereo pair, either as a still image or as a movie/motion picture, etc., optical polarization is used to distinguish (sometimes referred to as to discriminate between) the two images such that the left and right eye images are directed properly in respective left and right eye channels for viewing or for other such use as may be desired. In the exemplary embodiment described here, the left and right eye images are intended to be directed to the respective left eye and right eye of a person who would be viewing the images through the viewing device, e.g., through respective plane polarizers 316a, 316b. The optical output at the area 320 from the system 310 may be used for other purposes, if desired, e.g., for projection, for measurement, or for some other purpose.

The direction or plane of polarization of the images, e.g., the light forming the images, from the two displays 312a, 312b is the same for both displays and is parallel to or perpendicular to the mentioned linear axis. Therefore, upon reflection of the reflected image by the beam splitter 314, the beam splitter will not rotate the plane of polarization of such light.

As used herein, the term "monitor" may include a system of several displays, a system of several displays and associated circuitry and/or software, etc. and/or a single display—for shorthand convenience any of these terms and functions may be used equivalently and interchangeably with distinctions, if appropriate, being provided by context.

The images from the two displays 312a, 312b are distinguishable based on polarization although the polarization direction (plane of polarization of light provide thereby) of both displays is the same and is not changed by reflection. Therefore, a half wave plate 318a is in the light path 321a from one display, e.g., the left display 312a, to the beam splitter 314. The orientation of the half wave plate 318a is such that its slow axis is at 45 degrees to the plane of polarization of the linear polarized light incident on the half wave plate. Therefore, in the optimum condition (excluding dispersion and attendant elliptical polarization effect by the half wave plate) the half wave plate will tend to rotate the plane of polarization of the linear polarized light 90 degrees.

Without more, then, an output device 316, such as, for example, viewing glasses, for viewing the left and right images (left and right displays) could have linear polarizers that are oriented at right angles to each other, e.g., one horizontal and the other vertical, thereby to discriminate between the images from the two displays. However, dispersion occurs at the half wave plate because a half wave plate 318a is not a perfect half wave plate for all visible wavelengths that may transmit through the half wave plate. Therefore, some of that transmitted light in effect becomes elliptically polarized. As a result, accurate separation of the light from the left and right displays would not occur by two linear polarizers at right angles to each other at the viewing glasses.

The invention includes using at the viewing glasses 316 an additional (the further) half wave plate 318b. The additional half wave plate 318b is oriented to have its slow axis at 90 degrees relative to the direction of the slow axis of the first half wave plate 318a. Therefore, the additional half wave plate rotates the plane of incident linear polarized light back to the same directional relation it had prior to being incident on the first half wave plate. Also, the additional half wave plate will convert the elliptical polarized light back to the same linear polarization character it had prior to being incident on the first half wave plate, thus, eliminating the effect of dispersion.

With both of the linear polarizers (left eye lens and right eye lens) in the viewing glasses oriented in the same direction, then they will transmit the respective left and right images to the correct eyes.

A Display System Using Polarization Sensitive Beam Splitter.

An aspect of the invention relates to apparatus and method for displaying and viewing stereo images, wherein two displays (sometimes referred to as image generators or the like, as is mentioned elsewhere herein) provide respective stereo pairs that are plane polarized and are directed along respective light paths toward a polarization sensitive beam splitter. The term "polarization sensitive beam splitter" is described further below; the term may be used equivalently with the terms "polarizing beam splitter" or by some other term capable of carrying out the functions described herein. The light in one of the respective light paths has a polarization direction that is parallel to the plane of the beam splitter, and the direction of the plane of polarization of light in the other light path is crossed, e.g., by ninety degrees (90°) to the direction of plane of polarization of the first mentioned light path. The beam splitter combines the images by reflection and transmission and provides the combined images to a common light path without changing the direction of the plane of polarization of the plane polarized light that is incident thereon. Thus, optically downstream of the beam splitter the light in the common light path includes both stereo pair images that, respectively, are plane polarized in orthogonal directions.

Polarization sensitive beam splitters may be described as polarizers in some texts. One example is *Crystals and the Polarising Microscope*, N. H. Hartshorne and A. Stuart, 4th edition, 1970, American Elsevier Publishing, Co., Inc., New York, N.Y., for example, at pages 109-112. Another example is *Fundamentals Of Optics*, Francis A. Jenkins and Harvey E. White, 4th edition, 1976, McGraw-Hill, Inc., New York, N.Y., for example, at pages 498-513. Such texts are hereby incorporated in their entireties by this reference.

As an example of a useful characteristic of a polarization sensitive beam splitter in the present invention, such a beam splitter tends preferentially to transmit or to reflect plane polarized light that is of non-normal-incidence, depending on the direction of the plane of polarization. As an example, a relatively larger portion, e.g., percentage, of plane polarized light that has a direction of plane of polarization that is parallel to the plane of a planar beam splitter, e.g., is crossed (orthogonal) to the plane of polarization of the first mentioned light, and is of non-normal-incidence on the beam splitter may tend to be reflected by the beam splitter compared to the relatively smaller portion, e.g., percentage, of such light that is transmitted by the beam splitter. Continuing in such example, a relatively larger portion, e.g., percentage, of plane polarized light that has a direction of plane of polarization that is not parallel to the plane of such a planar beam splitter and is of non-normal-incidence on the beam splitter may tend to be transmitted by the beam splitter compared to the relatively smaller portion, e.g., percentage, of such light that is reflected by the beam splitter.

The mentioned texts provide several examples of crystals and/or other devices that may be used as such polarization sensitive beam splitters. Several of those examples are Brewster angle devices, crystals, a number of dielectric layers, and other devices. These are mentioned by way of example; it will be appreciated, too, that other devices may be used as a polarizing beam splitter (also known as a polarization sensitive beam splitter, etc.) in the present invention.

The beam splitter may be formed of a material, e.g., glass, plastic, crystal, or other suitable material, that has a coating which provides for differential reflection and transmission of plane polarized light depending on, based on or as a function of the direction of the plane of the plane polarized light, e.g., direction of the electric vector thereof. An exemplary coating material is indium tin oxide (sometimes referred to as ITO); and another exemplary material is titanium dioxide. The ITO and titanium dioxide are examples of relatively high index of refraction materials; other materials that provide such differential reflection and transmission based on direction of plane of polarization of plane polarized light may be used. The coating may be a single layer or may be multiple layers. Plane polarized light that has the electric vector in the plane of a beam splitter may have a greater portion of incident light on the beam splitter reflected than is transmitted by the beam splitter.

A beam splitter that includes such coating materials (or other beam splitters) may differentially reflect and transmit incident plane polarized light that has a given plane of polarization, such that more light is reflected and less is transmitted or vice-versa. As is described further below, the brightness of the images provided by the displays may be tuned, e.g., by adjusting the backlight of a liquid crystal display, e.g., a twisted nematic liquid crystal display or such other display that is used in the display system to achieve a desired balance or imbalance of the intensities of the images that are seen by the respective eyes of a viewer.

The stereo pair images can be discriminated, e.g., separated, based on optical polarization. For example, a viewing device, e.g., glasses, goggles, etc., having a pair of plane polarizers (sometimes referred to as viewing polarizers or analyzers) may be in position to receive light in the common light path. The direction of the plane of polarization (polarization direction) for transmitting light by the viewing polarizers is crossed, e.g., by 90 degrees, whereby they respectively transmit and block light of the respective stereo pair images.

It will be appreciated that the direction of planes of polarization for the plane polarized light images directed along the first and second respective optical paths (sometimes referred to as respective channels) to the polarization sensitive beam splitter are crossed. The beam splitter directs the images from both the first and second light paths (channels) to a common light path. In a sense, since the two images are in the same light path, they may be referred to as being multiplexed; and the multiplexed images can be discriminated or separated based on optical polarization characteristics.

The images in the common light path can be separated and simultaneously viewed via respective viewing polarizers, e.g., first and second plane polarizers, which may be positioned to view, respectively, images that were provided by the displays in the first and second optical paths.

From the foregoing it will be appreciated that absent other optical components in one or more of the optical paths, e.g. components that effect rotation, conversion to circular or elliptical polarization, etc., the direction of the plane of polarization of the viewing polarizers may be crossed. Also, if desired, the viewing polarizers may be one plane polarizer with respective portions for positioning before respective eyes of a viewer and an optical retarder or other polarization rotator may be positioned optically upstream of that portion of the viewing polarizer that is intended to be looked through by a respective viewer's eye to see a respective intended image that has optical polarization characteristics crossed to the viewing polarizer.

Optical dispersion may occur in optical retarders if the retardation is not carried out at zero order, as is known and as is mentioned in several of the above-referenced patents. Retardation at zero order, e.g., without dispersion, usually only is possible for a given optimum wavelength of light (or within a reasonable range of wavelengths near the optimum wavelength) of light for a given optical retarder.

As was described above with respect to the embodiment of FIGS. 19 and 20, the use of an optical retarder in respective image paths or the like may provide in a sense reciprocal dispersion and correction for dispersion to minimize the effect of dispersion on the display system. Use of the retarders as described also facilitates using twisted nematic liquid crystal displays that have relatively wide field of view or angle of view characteristics themselves. Use of the retarders also allows for using two displays that are the same, e.g., two twisted nematic liquid crystal cell type displays that each have the same relatively wide angle of view and thus provide for a relatively wide angle of view for the display system. Further, use of the same liquid crystal displays and arrangement of the polarization directions thereof to be the same (one being modified by a retarder in the light path of light from that display) facilitates using displays that have the same optical characteristics, aspect ratio, pitch, gamma characteristic, color characteristic, response time, etc.

FIGS. 21 and 22 illustrate a viewing system 300' including a display system or monitor 310' and a viewing device 316' for showing and viewing three-dimensional (3D, also known as stereo or stereoscopic) images. Parts in FIGS. 21 and 22 that are designated by prime reference numerals are the same as or similar to the parts in FIGS. 19 and 20 that are designated by the same unprimed reference numerals. A difference between the display system 310' from the display system 310 is that in the display system 310' the beam splitter is a polarization sensitive beam splitter. The directions of plane of polarization of several parts are as is described below.

The display system 310' includes a pair of displays 312a', 312b' to provide, for example, respective left eye and right eye images of a stereo pair of images, a polarization sensitive beam splitter 314', and a viewing device 316'. The displays 312a', 312b', respectively, provide left eye and right eye images formed by plane polarized light. Reference to plane polarization, linear polarization, linearly polarized, are intended to be equivalent. The displays and beam splitter are so positioned that the displays are at an angle A to each other, the planes of the displays intersect and are parallel to a common linear axis 18' (e.g., are congruent with the linear axis), and the beam splitter also is congruent with the linear axis B and is positioned along the bisectrix of the angle A. The angle A may be an obtuse angle, a ninety degree (90°) angle, or an acute angle. The angle A may be 180 degrees, as is illustrated in FIG. 17, for example. The angle A may be another angle that works; exemplary ranges of angles include from about 90 degrees to about 180 degrees, from about 91 to 160 degrees; about 120 degrees; an obtuse angle; and so forth.

The viewing device 316' includes a pair of plane polarizers 316a', 316b' that are oriented to have a polarization direction perpendicular to each other and the same as that of the respective images to be viewed therethrough. Reference to plane of polarization, direction of polarization, etc., are intended to be equivalent.

The planes of polarization for light that is incident on the beam splitter 314' from the respective displays 312a', 312b' are crossed, e.g., at 90 degrees to each other and either is parallel to or perpendicular to the linear axis 18. Therefore, as the beam splitter 314' reflects light from one of the displays toward a viewing area 320' and transmits light from the other display toward the viewing area, the beam splitter does not change the direction of the plane of polarization of the light. Incident light along respective light paths or optical paths (or channels) 321a', 321b' from the displays 312a', 312b' to the beam splitter 314' is in a sense combined by the beam splitter and is directed in a same or common light path or optical path 321c' (or substantially the same) toward the viewing area 320'.

The viewing device 316' may be placed near the eyes of a viewer, e.g., a person. The viewer would view images from the displays 312a', 312b' such that the left and right eyes, respectively, would view the respective left eye and right eye images, thereby to perceive a stereo image, e.g., as was described above.

Thus, in the example described it will be appreciated that plane polarized light in the left eye channel 321a' from the display 312a' may be viewed only by the left eye 322a' of a viewer, and the plane polarized light in the right eye channel 321b' from the display 312b' may be viewed only by the right eye 322b' of a viewer. The use of the terms left and right eye to designate the respective channels 321a' and 321b' are exemplary only and may be reversed, for example.

The displays 312a', 312b' and the polarization sensitive beam splitter 314' may be of the types described above. For example, the displays may be liquid crystal displays that provide images by light that is plane polarized. If desired, polarizers (or some other means), e.g., as are shown at 332a', 332b' in FIG. 21, may be used to provide the plane polarized light characteristic to the respective images. Other types of displays and/or additional devices or the like may be used to obtain the images with the plane polarized light characteristic. The displays may be relatively high resolution displays; they may have the same resolution, be of the same or different size, and have the same direction of plane of polarization or are adjusted to have polarization directions to provide for the functions described herein. One image from one of the displays would be inverted as was described above with respect to the embodiments of FIGS. 1-20.

The displays 312a', 312b' may be twisted nematic liquid crystal displays that have the same direction of polarization, e.g., relative to the axis 18', and such that light from one display has a polarization direction that is parallel to the plane of the beam splitter, e.g., may be parallel to the axis 18'; and the polarization direction of light from the other display is relatively crossed to the axis 18', for example. An optical retarder 318a' in one light path between a liquid crystal display, e.g., display 312a', rotates the plane of polarization of light from that display to the desired direct, e.g., crossed relative to the plane of polarization of the light from the other display, e.g., display 312b'. An optical retarder 318b' in the viewing device 316' or in the light path from the beam splitter to the viewing device 316' provides a function like the retarder 318b, which is described above with respect to FIGS. 19 and 20.

Other types of liquid crystal displays may be used, e.g., in plane switching (IPS) displays or vertical aligned nematic (VAN) liquid crystal displays.

The polarization sensitive beam splitter 314' does not change the polarization characteristic of the polarized light incident thereon and either transmitted or reflected thereby because the plane of polarization (sometimes referred to as the direction of polarization) of such incident light is parallel to or perpendicular to the mentioned linear axis. Without having a specific nomenclature for describing the polarization direction of the light incident on the beam splitter, one might refer such polarized light being square to the surface of the beam splitter rather than being at an angle to the surface of the beam splitter—in contrast an angular relation is described above with reference to earlier described embodiments herein to obtain rotation of the plane of polarization of the reflected plane polarized light. However, since the beam splitter is a polarization sensitive beam splitter, the beam splitter and displays may be positionally related to enhance brightness and/or contrast of the viewed images compared to using a non-polarization sensitive beam splitter because a greater amount (percentage) of light can be reflected or transmitted by the beam splitter for use to provide images for viewing than is in a sense wasted as light that is not directed to the viewer.

The display system 310' also includes a viewing device 316' to view the images from the displays 312a', 312b'. The viewing device may be, for example, a pair of plane polarizers 316a', 316b'; the plane polarizers may be mounted or held in a frame, e.g., as an eyeglass frame or the like or some other device, as is described above.

With the displays 312a', 312b' displaying respective left eye and right eye images of a stereo pair, either as a still image or as a movie/motion picture, etc., optical polarization is used to distinguish (sometimes referred to as to discriminate between) the two images such that the left and right eye images are directed properly in respective left and right eye channels for viewing or for other such use as may be desired. In the exemplary embodiment described here, the left and right eye images are intended to be directed to the respective left eye and right eye of a person who would be viewing the images through the viewing device, e.g., through respective plane polarizers 316a', 316b'. The optical output at the area 320' from the system 310' may be used for other purposes, if desired, e.g., for projection, for measurement, or for some other purpose.

Although retarders may be used in the light paths as described, e.g., to rotate the plane of polarized light in one light path from a display to the beam splitter in a display system of the type described herein, other means may be used to provide for the plane of polarization of light that is incident on the display from the two displays to be relatively crossed. For example, the displays may be arranged such that one has polarization direction parallel to the plane of the beam splitter and the other has polarization direction perpendicular (crossed, orthogonal) to the first mentioned polarization direction; or different displays may be used each having a respective direction of the plane of polarization of light provided thereby. The displays may provide outputs that, respectively, have crossed polarization.

The angle A between the displays of the several embodiments hereof, which are exemplary, may be different respective angles. Several examples are described herein. Also, it will be appreciated that although the embodiments illustrated in several figures show the displays in a side by side arrangement, the features may be employed in an over and under (above and below) arrangement of displays, e.g., as is illustrated in FIGS. 10-15 or in a windowed arrangement of FIG. 16, etc.

Referring to the beam splitters of the several embodiments a balanced or 50/50 beam splitter may transmit half the light incident thereon and reflect half the light incident thereon. A polarizing beam splitter may provide for reflecting a different percentage of incident light than is transmitted by the beam splitter, for example, depending on the direction of the plane of polarization of the light that is incident on the beam splitter and the optical characteristics of the beam splitter. By using a polarizing beam splitter in the display system, it may be possible to increase efficiency of the display system by increasing the amount of plane polarized light of a given polarization direction that is reflected by the beam splitter relative to the amount of such light that is transmitted and, thus, may be lost from use in displaying an image via the beam splitter. Similarly, efficiency of the display system and display(s) thereof may be increased by increasing the amount of plane polarized light of a given polarization direction that is transmitted by the beam splitter relative to the amount of such light that is reflected and, thus, may be lost from use in displaying an image via the beam splitter. As an example, a Brewster Angle reflection beam splitter may increase the amount of reflection of light of a given polarization direction by 20% compared to the amount of light that would be reflected using a nonpolarizing beam splitter. Thus, the use of a polarizing beam splitter may makes invention more efficient because less light from the display(s) is lost from reaching the common viewing path, etc.

The polarizing beam splitter and the displays (and possibly other optical elements associated with the display(s)) may be arranged such that the polarization direction (direction of plane of polarization) of the light intended to be reflected by the beam splitter is parallel to the surface of the beam splitter, e.g., is parallel to the axis 18 or 18', e.g., the upper display 101 in an over/under arrangement of FIGS. 10-15 or 312b, 312b' in a side by side arrangement of FIGS. 19-22; and the direction of plane of polarization of the light from the display that is intended to be transmitted by the beam splitter to the viewing path is perpendicular (crossed, orthogonal) to that of the first-mentioned reflected light. In at least some instances this arrangement and relationship of direction of plane of polarization relative to the beam splitter may provide for enhanced efficiency of providing light to the common viewing path for viewing.

Referring to the coating that may be applied to a light transmissive plate, e.g., a glass plate or plastic plate, as was mentioned above, to form a beam splitter that may be used in the invention, the coating may have a relatively high index of refraction. The coating may be applied as or be of a thickness that is a multiple of one half the wavelength of the light that is intended to be reflected, for example. Such relationship may be referred to as a multiple of "lambda over two" or $\lambda/2$ (where lambda is the wavelength of light). Using a coating of such thickness on one surface of the beam splitter, the coating becomes a relatively strong reflector for light of a plane of polarization that is parallel to the plane of the beam splitter, thus reinforcing the reflected light or increasing the reflective efficiency of the beam splitter. The wavelength lambda may be considered a desired or in some instances a critical wavelength, namely, a wavelength of light that is desired to be reflected by the beam splitter. Using a thickness that is several multiples of lambda over two provides a relatively wide bandwidth for reflected light (including several desired wavelengths and possibly wavelengths that are near those desired wavelengths. Using such a beam splitter with coatings may reduce the cost for a beam splitter relative to other types of relatively more expensive beam splitters. If the coating thickness is a multiple of lambda over 4 ($\lambda/4$) would give for that wavelength ($\lambda$) relatively increased transmission. Also, the angle at which the light from the displays impinges on the beam splitter may affect the amount of light that is transmitted and reflected, respectively, by the beam splitter. Angles described herein, including 45 degrees, and also including other angles, appear to be acceptable for the descried operation of the display system as described herein using a beam splitter that is made using the coatings as described.

As was mentioned, the polarizing beam splitter (or another beam splitter) may have different reflection and transmission characteristics such that the brightness or intensity of light from a given display is attenuated more or less by the beam splitter relative to the attenuation of light from the other display, as such light is directed by the beam splitter to the common path. It is possible to tune the display system by adjusting the brightness or intensity of light provided by one or both displays, e.g., by adjusting the backlight (or other illuminating light thereof), to achieve a desired balance of brightness of the images therefrom as provided the common light path or viewing path for viewing by a viewer at the viewing area 320'. For example, a user could turn down the backlight of one of the displays and/or turn up the backlight of the other display. Other techniques also may be used to adjust the brightness of the images provided by the respective display(s) and directed for viewing via the common light path.

Figure 23:
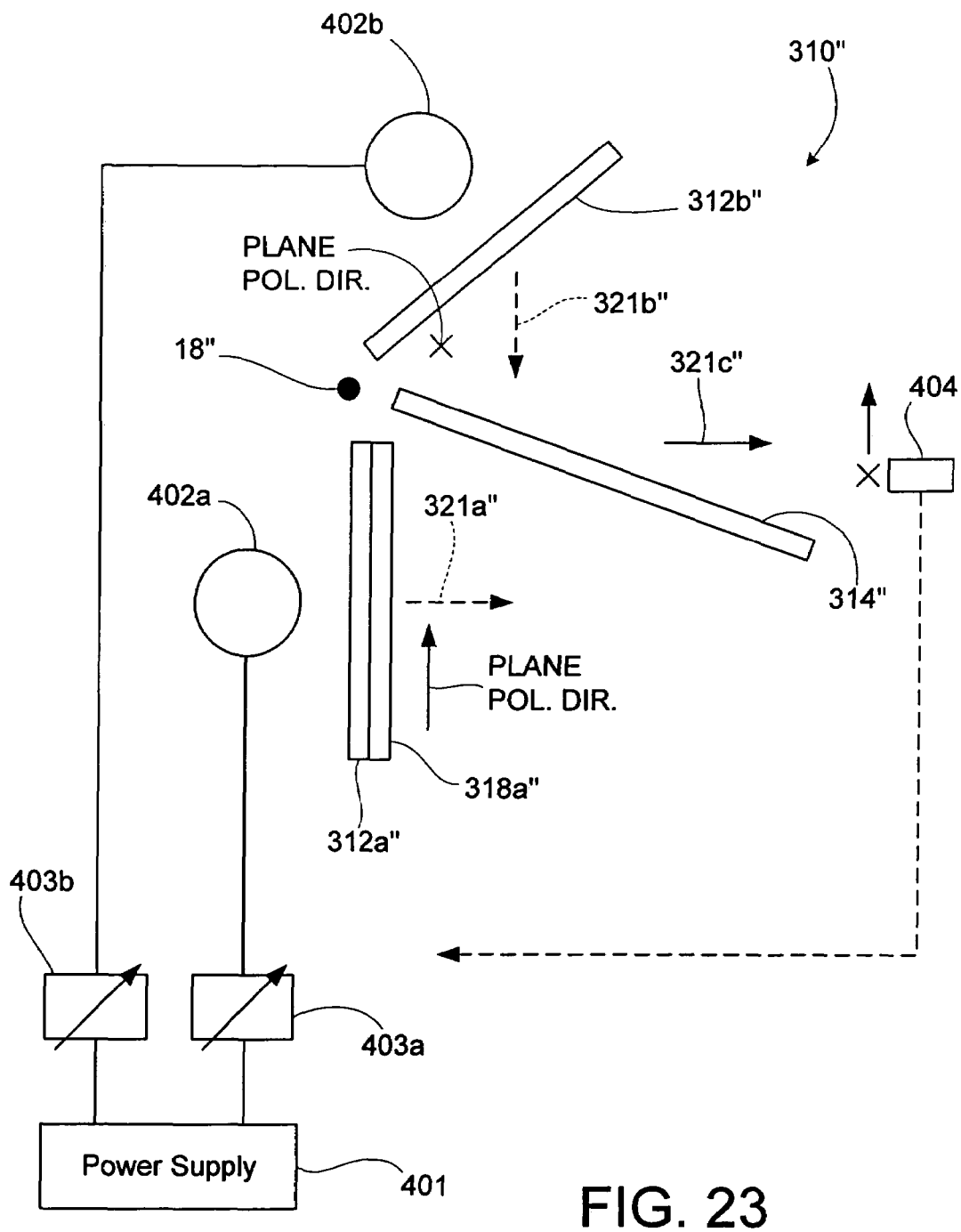
FIG. 23 is a schematic illustration of a circuit for adjusting the backlight intensity or other image intensity or brightness characteristic of one or more displays of a display system according to an embodiment of the invention.

Briefly referring to FIG. 23, a display system 310" is illustrated. The display system 310" is similar to the display systems 310, 310'. In FIG. 23 parts designated by double primed reference numerals, e.g., 310", are similar to the parts described above and represented by unprimed and by single primed reference numerals, e.g., 310, 310'.

In the display system 310" a power supply 401 provides power or other inputs to respective backlights 402a, 402b of the respective displays 312a, 312b, for example, to provide light for illuminating the respective displays. Controls or adjustments 403a, 403b are coupled between the power supply 401 and the respective backlights 402a, 402b to control the power thereto or other energization thereof. For example, the power supply 401 may be a transformer that is coupled to an electrical outlet and supplies electrical power at a voltage and current suitable to operate the backlights 402a, 402b and also may provide power to operate the respective displays. The power supply 401 may be a battery, etc. The controls 403a, 403b may be potentiometers, dimmers, electronic controls, etc., to control the power supplied to the backlights and thereby to control the intensity of the light provided by the backlights. The power supply 401 and the controls 403a, 403b may be other types of devices that may adjust the intensity of the light output representing images from the respective displays. If desired there may be only a single control for controlling intensity of one of the displays and the other display may be operated at a substantially constant light intensity. As is known in the display field, several techniques are available to adjust the brightness or intensity of the output image provided by a display, whether a liquid crystal display or other type of display; and various of these also may be used in the present invention.

By adjusting the brightness of one or both of the backlights 402a, 402b, the intensity or brightness of the images provided the beam splitter and ultimately transmitted or reflected by the beam splitter may be adjusted to achieve a desired balance of intensity of those images. In this way the display system 310" may be tuned.

If desired, a detector 404 may be used to detect the intensity of light in the common light path 321c" representing the image from one display or the images from both displays, e.g., by detecting light having one polarization or each of the respective lights having respective polarizations, which are represented by respective arrow and X (or cross) labeled "plane pol. dir." adjacent respective displays 312a", 312b". The response of the detector may be fed back to the controls 403a and/or 403b to control the backlights 402a, 402b or the displays 312a", 312b" to achieve a desired balance of light intensities in the common light path 321c" representing images from the respective displays.

Although the invention has been shown and described with respect to several embodiments, equivalent alterations and modifications will occur to others skilled in the art upon reading and understanding this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

It will be appreciated that portions of the present invention can be implemented in hardware, software, firmware, or a combination thereof. In the described embodiment(s), a number of the steps or methods may be implemented in software or firmware that is stored in a memory and that is executed by a suitable instruction execution system. If implemented in hardware, for example, as in an alternative embodiment, implementation may be with any or a combination of the following technologies, which are all well known in the art: discrete logic circuit(s) having logic gates for implementing logic functions upon data signals, application specific integrated circuit(s) (ASIC) having appropriate combinational logic gates, programmable gate array(s) (PGA), field programmable gate array(s) (FPGA), etc.

Any process or method descriptions or blocks in flow charts may be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

The above description and accompanying drawings depict the various features of the invention. It will be appreciated that the appropriate computer code could be prepared by a person who has ordinary skill in the art to carry out the various steps and procedures described above and illustrated in the drawings. It also will be appreciated that the various terminals, computers, servers, networks and the like described above may be virtually any type and that the computer code may be prepared to carry out the invention using such apparatus in accordance with the disclosure hereof.

INDUSTRIAL APPLICATION

The present invention may be used to provide stereoscopic (three-dimensional) or monoscopic (two-dimensional) images for viewing and/or for other use.

The invention claimed is:

1. A system for images, comprising:
    a beam splitter receiving respective images, which have plane polarized light characteristics, along respective first and second light paths and directing the images to a common light path,
    a viewer to receive the images in the common light path to discriminate the images based on plane polarized light characteristics, the viewer having first and second viewing channels to provide for viewing the images from the first and second light paths, respectively,
    a first optical retarder introducing optical retardation in the first light path, the optical retarder rotating the direction of polarization of plane polarized light, and
    a second optical retarder introducing optical retardation in the second viewing channel and substantially compensating for dispersion by the first optical retarder,
    wherein the polarization direction of the plane polarized light in the first light path optically upstream of the first optical retarder is the same as the polarization direction of the plane polarized light in the second light path.

2. The system of claim 1, wherein the beam splitter transmits light from one light path and reflects light from the other light path without changing the direction of optical polarization.

3. The system of claim 2, wherein the viewer includes a pair of plane polarizers having the same polarization direction.

4. The system of claim 1, wherein optical dispersion caused by the first retarder is substantially cancelled by the second optical retarder.

5. The system of claim 1, wherein the first and second optical retarders are half wave plates.

6. The system of claim 5, wherein a slow axis of the first half wave plate is at about positive forty-five degrees (+45°) to the polarization direction of the plane polarized light in the second light path, and a slow axis of the second half wave plate is at about negative forty-five degrees (−45°) to the polarization direction of the plane polarized light in the second light path.

7. A display system, comprising
a pair of displays arranged at an angle to each other to provide respective images having plane polarization such that the polarization direction for both images is the same;
a beam splitter located relative to the displays to combine plane polarized light images received along respective first and second optical paths from the displays to provide such plane polarized light images along a common optical path;
a wave plate arrangement in said first optical path to effect optical retardation of plane polarized light to rotate the plane of polarization thereof;
the displays, beam splitter and wave plate being related such that reflection of light by the beam splitter from one of the respective optical paths occurs without changing the polarization; and
whereby the respective images in the common optical path can be discriminated by optical polarization.

8. The system of claim 7, the displays being the same.

9. The system of claim 7, the displays comprising liquid crystal displays.

10. The system of claim 7, the displays comprising respective image generators that produce unpolarized light and plane polarizers to polarize such unpolarized light.

11. The system of claim 7, further comprising a viewing device for viewing images transmitted along the common light path, the viewing device including a pair of plane polarizers and a further wave plate arrangement to rotate the plane of polarized light by 90 degrees, the plane polarizers establishing first and second viewing paths, the polarizer in the first viewing path having a polarization direction to transmit light from the one of said displays providing images in the optical path that includes the first mentioned wave plate arrangement, the polarizer in the second viewing path having the same polarization direction as the polarizer in the first viewing path, and the wave plate arrangement positioned in the second viewing path.

12. The system of claim 7, wherein light in the respective optical paths incident on the beam splitter has different optical polarization.

13. The system of claim 7, further comprising a pair of plane polarizers for discriminating images in said common optical path, the plane polarizers having the same polarization direction, and another wave plate arrangement in the optical path of one of the plane polarizers to effect optical retardation of light to rotate the direction of plane polarization thereof, whereby said one of said polarizers blocks light from said second optical path and transmits light from said first optical path.

14. The system of claim 13, wherein the wave plate and the another wave plate provide the same optical retardation but in the opposite sense.

15. The system of claim 7, the displays being generally planar and at an obtuse angle, the beam splitter having a generally planar reflecting portion at the bisectrix of the obtuse angle, and the displays and reflecting portion of the beam splitter being in positional relation such that the planes thereof or the extensions of the planes thereof intersect a common linear axis.

16. A stereoscopic viewing system, comprising:
a pair of displays arranged generally in respective planes that are at an angle to each other and intersect a common linear axis, the displays having plane polarization such that the direction of polarization is in the same direction;
a beam splitter at the bisectrix of the angle and in positional relation to combine light from said displays in a common light path by transmitting light from one display and reflecting light from the other display without changing polarization direction of the light incident on the beam splitter;
an optical retarder in the light path between one of the displays and the beam splitter to rotate the plane of polarized light by 90 degrees; and
a viewing device for viewing images transmitted along the common light path, the viewing device including a pair of plane polarizers and a further optical retarder to rotate the plane of polarized light by 90 degrees, the plane polarizers establishing first and second viewing paths, the polarizer in the first viewing path having a polarization direction to transmit light from the one of said displays providing images in the optical path that includes the first mentioned optical retarder, the polarizer in the second viewing path having the same polarization direction as the polarizer in the first viewing path, and the further optical retarder positioned in the second viewing path.

17. The system of claim 16, wherein the viewing device is an eyeglass or goggle viewing device.

18. The system of claim 16, wherein the optical retarder and the further optical retarder provide the same optical retardation but in the opposite sense.

19. A method of displaying stereo images, comprising:
providing along respective optical paths light, which has plane polarization in the same polarization direction, toward a beam splitter;
optically retarding light in one of the optical paths to rotate the plane of polarization in that optical path by 90 degrees;
using a beam splitter, reflecting and transmitting light from the respective optical paths into a common optical path substantially without affecting polarization; and
discriminating light in the common optical path to distinguish between light from the respective optical paths, the discriminating comprising using respective plane polarizers, which have the same polarization direction, and providing optical retardation in the optical path to one of the plane polarizers whereby such plane polarizer blocks light that was optically retarded in said one of the optical paths while such plane polarizer transmits light from the other of said respective optical paths and the other plane polarizer transmits light from said one of the optical paths while blocking light from the other of said respective optical paths.

20. A display system, comprising:
a pair of displays;
the displays being operable to provide respective left and right images of a stereo pair for viewing by a viewing device, the images provided by said displays having linear (plane) optical polarization in the same direction;
a beam splitter;
the displays and beam splitter positioned relative to each other for viewing of one display through the beam splitter and viewing of the other display by reflection;
a first half wave plate between one display and the beam splitter and oriented to rotate in one direction the plane of polarization of light from one display for viewing as one of a left eye or right eye image; and
a second half wave plate positioned and oriented to rotate in a direction opposite such one direction some light from the displays for permitting viewing of light from the other display as the other of a left eye or right eye image while blocking from such viewing light from said one display.

21. A display system, comprising:

a pair of displays;

the displays being operable to provide respective left and right images of a stereo pair, the images provided by said displays having linear (plane) optical polarization in the same direction;

a beam splitter;

the displays being at an angle relative to each other and congruent with a linear axis, and the beam splitter being congruent with such linear axis and at the bisectrix of such angle for viewing of one display through the beam splitter and viewing of the other display by reflection;

a first wave plate positioned relative to one display to rotate the plane of polarization of light from that display without rotating the plane of polarization of light from the other display; and a viewing device including a pair of plane polarizers positioned to transmit to respective eyes of a viewer respective left and right images from the respective displays, the plane of polarization of said pair of polarizers being the same and for use being relatively perpendicular to the plane of polarization of light from the displays; and a second wave plate positioned relative to the viewing device to rotate the plane of polarization of light transmitted to one of said polarizers without rotating the plane of polarization of light provided to the other polarizer.

22. The system of claim 21, the wave plates comprising half wave plates.

23. The system of claim 21, the displays and beam splitter being positioned relative to each other such that the beam splitter does not rotate the plane of polarization of light incident thereon.

24. A display system, comprising:

a pair of displays, each display being operable to provide an image having linear optical polarization;

a beam splitter;

the displays and beam splitter positioned relative to each other for viewing of one display through the beam splitter and viewing of the other display by reflection; and a half wave plate for rotating the plane of polarization of light from one display.

25. The system of claim 24, wherein the polarization direction of the displays is the same relative to an axis that intersects the planes of the displays and the plane of the beam splitter.

26. The system of claim 24, wherein the displays are at an angle to each other, and the beam splitter is at the bisectrix of the angle between the displays.

27. The system of claim 24, further comprising viewing polarizers, the viewing polarizers being linear polarizers having a plane of polarization in the same direction, and a half wave plate in the optical path between the first half wave plate and one of the viewing polarizers.

28. A system for images, comprising:

a beam splitter receiving respective images, which have plane polarized light characteristics, along respective first and second light paths and directing the images to a common light path, wherein said directing comprises transmitting light from one light path and reflecting light from the other light path without changing the direction of optical polarization; and a viewer to receive the images in the common light path and to discriminate the images based on plane polarized light characteristics, the viewer having first and second viewing channels to provide for viewing the images from the first and second light paths, respectively, wherein the viewer includes a pair of plane polarizers having the same polarization direction.

29. The system of claim 28, further comprising:

a first optical retarder introducing optical retardation in the first light path, the optical retarder rotating the direction of polarization of plane polarized light, and a second optical retarder introducing optical retardation in the second viewing channel and substantially compensating for dispersion by the first optical retarder.

30. The system of claim 28, wherein the polarization direction of the plane polarized light in the first light path optically upstream of said first optical retarder is the same as the polarization direction of the plane polarized light in the second light path, and wherein the dispersion by the first optical retarder is canceled by the second optical retarder.

* * * * *